(12) United States Patent
Zhu et al.

(10) Patent No.: US 11,741,952 B2
(45) Date of Patent: Aug. 29, 2023

(54) VOICE SKILL STARTING METHOD, APPARATUS, DEVICE AND STORAGE MEDIUM

(71) Applicant: Baidu Online Network Technology (Beijing) Co., Ltd., Beijing (CN)

(72) Inventors: Guangya Zhu, Beijing (CN); Xiao Zhou, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 615 days.

(21) Appl. No.: 16/847,852

(22) Filed: Apr. 14, 2020

(65) Prior Publication Data

US 2021/0065707 A1    Mar. 4, 2021

(30) Foreign Application Priority Data

Aug. 29, 2019 (CN) .......................... 201910809147.8

(51) Int. Cl.
*G06F 17/00* (2019.01)
*G10L 15/22* (2006.01)
(Continued)

(52) U.S. Cl.
CPC ................ *G10L 15/22* (2013.01); *G06N 5/04* (2013.01); *G06N 20/00* (2019.01)

(58) Field of Classification Search
CPC ........... G10L 15/22; G06N 5/04; G06N 20/00
(Continued)

(56) References Cited

U.S. PATENT DOCUMENTS 4,785,420 A   11/1988   Little
9,730,040 B2   8/2017   Hafeman
(Continued)

FOREIGN PATENT DOCUMENTS

CN   103295389 A   9/2013
CN   103605531 A   2/2014
(Continued)

OTHER PUBLICATIONS

First Office Action of Chinese priority application No. 201910809147.8 dated Jul. 2, 2021, six pages.
(Continued)

*Primary Examiner* — Paul C McCord
(74) *Attorney, Agent, or Firm* — Harness, Dickey & Pierce, P.L.C.

(57) ABSTRACT

The present application discloses a voice skill starting method, an apparatus, a device, and a storage medium, and relates to the field of artificial intelligence. An implementation scheme is that: the method is applied to an electronic device including at least one third-party voice skill and a built-in voice skill, and the electronic device is currently in the built-in voice skill. The method includes: receiving a current demand instruction of a user; judging whether the current demand instruction belongs to an entry demand instruction corresponding to the third-party voice skill according to a mapping relationship in response to the current demand instruction; and switching from the built-in voice skill to the third-party voice skill if it is determined that the current demand instruction belongs to the entry demand instruction corresponding to the third-party voice skill.

13 Claims, 9 Drawing Sheets

(51) Int. Cl.
  *G06N 20/00* (2019.01)
  *G06N 5/04* (2023.01)
(58) Field of Classification Search
  USPC .......................................................... 704/275
  See application file for complete search history.

(56) References Cited

U.S. PATENT DOCUMENTS

2014/0365885 A1* 12/2014 Carson ................ G06F 16/3344
                                                    715/708
2018/0336045 A1* 11/2018 Badr ........................ G06F 9/453
2020/0342850 A1* 10/2020 Vishnoi ................. H04L 51/214

FOREIGN PATENT DOCUMENTS

| CN | 105161100 A | 12/2015 |
|----|-------------|---------|
| CN | 107018239 A | 8/2017  |
| CN | 109508399 A | 3/2019  |
| CN | 109710137 A | 5/2019  |
| CN | 109901899 A | 6/2019  |
| JP | H0981632 A  | 3/1997  |
| JP | 2015528140 A| 9/2015  |
| JP | 2019520661 A| 7/2019  |

OTHER PUBLICATIONS

First Office Action of corresponding Japanese application No. 2020-019065 dated Apr. 20, 2021, four pages.

* cited by examiner

VOICE SKILL STARTING METHOD, APPARATUS, DEVICE AND STORAGE MEDIUM

CROSS-REFERENCE TO RELATED APPLICATION

This application claims priority to Chinese Patent Application No. 201910809147.8, filed on Aug. 29, 2019, which is hereby incorporated by reference in its entirety.

TECHNICAL FIELD

The present application relates to the field of data processing technology, and in particular to artificial intelligence technology.

BACKGROUND

With the maturity of artificial intelligence technology, more and more intelligent voice interaction devices appear, such as smart speakers, smart televisions, smart refrigerators and other home appliance devices. In order to continuously enrich voice skills of the smart voice interaction devices, both a built-in voice skill and a third-party voice skill may exist in the smart voice interaction devices.

In the prior art, if an intelligent voice interaction device is required to start a third-party voice skill, the third-party voice skill needs to be started through an obvious demand instruction. Such as, if the obvious demand instruction is "open XX music", the intelligent voice interaction device will start "XX music".

A method for starting a third-party voice skill in the prior art can be started only after a user commands to open the third-party voice skill. As a result, the third-party voice skill cannot compete fairly with a built-in voice skill, thereby cannot providing the user with a response that can better satisfy user's requirements.

SUMMARY

Embodiments of the present application provide a voice skill starting method, an apparatus, a device, and a storage medium, which solves the technical problem in the prior art that a third-party voice skill cannot compete fairly with a built-in voice skill, thereby cannot providing a user with a response that can better satisfy user's requirements.

A first aspect of the embodiments of the present application provides a voice skill starting method, where the method is applied to an electronic device including at least one third-party voice skill and a built-in voice skill, and the electronic device is currently in the built-in voice skill, and the method includes:

receiving a current demand instruction of a user; judging whether the current demand instruction belongs to an entry demand instruction corresponding to the third-party voice skill according to a mapping relationship in response to the current demand instruction, where the mapping relationship is a pre-established mapping relationship between the third-party voice skill and the entry demand instruction, the mapping relationship is determined according to skill-associated characteristic data of a first historical demand instruction under each third-party voice skill, and the first historical demand instruction is located in the built-in voice skill; and switching from the built-in voice skill to the third-party voice skill if it is determined that the current demand instruction belongs to the entry demand instruction corresponding to the third-party voice skill.

In the embodiment of the present application, when the electronic device is currently in the built-in voice skill, it is judged whether the current demand instruction belongs to the entry demand instruction of the third-party voice skill, which can enable the third-party voice skill to compete fairly with the current built-in voice skill. And since the entry demand instruction having the mapping relationship with the third-party voice skill is obtained by filtering the first historical demand instruction according to the skill-associated characteristic data of the first historical demand instruction under each third-party voice skill, and a correlation between the entry demand instruction and the third-party voice skill is stronger than a correlation between the entry demand instruction and the built-in voice skill, hence when it is determined that the current demand instruction is an entry demand instruction of a third-party voice skill, and user's requirements are better satisfied by a response of the third-party voice skill than a response of the current built-in voice skill.

Further, the method described above, before the receiving a current demand instruction of a user, further includes:

obtaining the first historical demand instruction in the built-in voice skill; determining the skill-associated characteristic data of the first historical demand instruction under each third-party voice skill; obtaining the entry demand instruction corresponding to each third-party voice skill by filtering the first historical demand instruction according to the skill-associated characteristic data; and establishing the mapping relationship between each third-party voice skill and the corresponding entry demand instruction.

In the embodiment of the present application, since the skill-associated characteristic data of the first historical demand instruction under each third-party voice skill reflects whether the first historical demand instruction can be used as the entry demand instruction, and whether the first historical demand instruction has a stronger correlation with each third-party voice skill than the built-in voice skill, so the entry demand instruction corresponding to each third-party voice skill is determined by filtering the first historical demand instruction according to the skill-associated characteristic data, which can make the determined entry demand instruction more suitable to act as the entry demand instruction of the third-party voice skill.

Further, the method described above, after the obtaining the entry demand instruction corresponding to each third-party voice skill by filtering the first historical demand instruction according to the skill-associated characteristic data, further includes:

judging whether there is one third-party voice skill corresponding to each entry demand instruction; if there are multiple third-party voice skills corresponding to an entry demand instruction, determining an occurrence frequency of that entry demand instruction in each corresponding third-party voice skill; and determining a third-party voice skill with the highest occurrence frequency as the third-party voice skill that has the mapping relationship with that entry demand instruction.

In the embodiment of the present application, it is determined that only one third-party voice skill has the mapping relationship with each entry demand instruction by the occurrence frequency of the entry demand instruction in the corresponding third-party voice skill, which can enable a switching from the currently built-in voice skill to the best third-party voice skill, thereby avoiding the problem of being unable to determine which third-party voice skill to switch to. Moreover, switching to the best third-party voice skill and responding with the best third-party voice skill further improves the satisfaction of the user's requirements.

Further, in the method described above, the determining the skill-associated characteristic data of the first historical demand instruction under each third-party voice skill, includes:

determining skill-associated entry characteristic data of the first historical demand instruction under each third-party voice skill; and determining skill satisfaction data of a second historical demand instruction in the first historical demand instruction under each third-party voice skill.

In the embodiment of the present application, the skill-associated entry characteristic data of the first historical demand instruction under each third-party voice skill is determined first; and then the skill satisfaction data of the second historical demand instruction in the first historical demand instruction under each third-party voice skill is determined, which can provide a comprehensive characteristic basis for filtering of the first historical demand instruction, and make the filtered entry demand instruction of each third-party voice skill more accurate.

Further, in the method described above, the obtaining the entry demand instruction corresponding to each third-party voice skill by filtering the first historical demand instruction according to the skill-associated characteristic data, includes:

obtaining the second historical demand instruction corresponding to each third-party voice skill by filtering the first historical demand instruction according to the skill-associated entry characteristic data; and obtaining the entry demand instruction corresponding to each third-party voice skill by filtering the second historical demand instruction according to the skill satisfaction data.

In the embodiment of the present application, the first historical demand instruction can be filtered for the first time by using the skill-associated entry characteristic data, and the first historical demand instruction that cannot have the characteristic of the entry demand instruction of the third-party voice skill is eliminated. The second historical demand instruction can be filtered for the second time according to the skill satisfaction data, and the second historical demand instruction that cannot be satisfied by the third voice skill is eliminated, so that the filtered entry demand instruction of each third-party voice skill is more accurate.

Further, in the method described above, the obtaining the second historical demand instruction corresponding to each third-party voice skill by filtering the first historical demand instruction according to the skill-associated entry characteristic data, includes:

inputting the skill-associated entry characteristic data of the first historical demand instruction into a trained-to-converged classification model corresponding to each third-party voice skill for classifying the first historical demand instruction by the classification model to obtain the second historical demand instruction corresponding to each third-party voice skill.

In the embodiment of the present application, for each third-party voice skill, there is a corresponding trained-to-converged classification model, and the trained-to-converged classification model is used to filter the first historical demand instruction to obtain the second historical demand instruction, which can make the filtered second historical demand instruction to better satisfy a demand instruction of an entry characteristic corresponding to the third-party voice skill.

Further, the method as described above, before the inputting the skill-associated entry characteristic data of the first historical demand instruction into a trained-to-converged classification model corresponding to each third-party voice skill, further includes:

obtaining a training sample of each classification model, where the training sample is a demand instruction sample, and the demand instruction sample has an identifier for identifying whether a demand instruction is capable of being used as the entry demand instruction corresponding to the third-party voice skill; and training the corresponding classification model by using skill-associated entry characteristic data of the training sample until convergence, to obtain each trained-to-converged classification model.

In the embodiment of the present application, the demand instruction sample with identification information is used as the training sample of the classification model, which can make the trained classification model more suitable for the test sample, thereby causing the classification result more accurate.

Further, in the method described above, the skill-associated entry characteristic data includes: entry behavior characteristic data, skill correlation characteristic data, and entry grammar characteristic data.

In the embodiment of the present application, the skill-associated entry characteristic data includes multiple types, which can more comprehensively extract the skill-associated entry characteristic of the first historical demand instruction.

Further, in the method described above, the skill satisfaction data includes content satisfaction or interaction satisfaction, and the determining skill satisfaction data of a second historical demand instruction in the first historical demand instruction under each third-party voice skill, includes:

judging whether each third-party voice skill is a resource skill; if a third-party voice skill is the resource skill, determining a content satisfaction of the second historical demand instruction under that third-party voice skill; and if a third-party voice skill is a non-resource skill, determining an interaction satisfaction of the second historical demand instruction under that third-party voice skill.

In the embodiment of the present application, the corresponding skill satisfaction data is determined according to a type of the third-party voice skill, which can provide an accurate basis for subsequent filtering of the second historical demand instruction.

Further, in the method described above, the determining a content satisfaction of the second historical demand instruction under that third-party voice skill, includes:

obtaining a first playback resource duration of the second historical demand instruction under that third-party voice skill and a second playback resource duration of the second historical demand instruction under the built-in voice skill; and determining the content satisfaction according to the first playback resource duration and the second playback resource duration.

In the embodiment of the present application, since the playback resource duration is an important indicator for measuring whether a resource voice skill satisfies the user's requirements, therefore, the content satisfaction of the second historical demand instruction under the third-party voice skill is determined according to the playback resource duration of the third-party voice skill and the playback resource duration of a built-in voice skill, so that the content satisfaction is determined more accurate.

Further, in the method described above, the determining an interaction satisfaction of the second historical demand instruction under that third-party voice skill, includes:

obtaining text of a multi-round conversation corresponding to the second historical demand instruction under that third-party voice skill; determining a skill response satisfaction and a skill response repetition rate of the second historical demand instruction under that third-party voice skill according to the text of the multi-round conversation; and determining the interaction satisfaction according to the skill response satisfaction and the skill response repetition rate.

In the embodiment of the present application, since the skill response satisfaction and the skill response repetition rate are important indicators for measuring whether an interaction voice skill satisfies the user's requirements, therefore, the interaction satisfaction is determined using the skill response satisfaction and skill response repetition rate of the second historical demand instruction under the third-party voice skill, which can make the determined interaction satisfaction more accurate.

Further, in the method described above, the obtaining the entry demand instruction by filtering the second historical demand instruction according to the skill satisfaction data, includes:

if a third-party voice skill is the resource skill, obtaining the entry demand instruction by filtering the second historical demand instruction according to a content satisfaction of the second historical demand instruction under that third-party voice skill; and if a third-party voice skill is a non-resource skill, obtaining the entry demand instruction by filtering the second historical demand instruction according to an interaction satisfaction of the second historical demand instruction under that third-party voice skill after it is determined that there is no playback resource record corresponding to the second historical demand instruction in the built-in voice skill.

In the embodiment of the present application, a characteristic basis for filtering the second historical demand instruction is determined according to the type of the third-party voice skill, which can enable the third-party voice skill to achieve effective content satisfaction or interaction satisfaction after being started according to the filtered entry demand instruction, thereby improving user satisfaction for voice skill response.

A second aspect of the embodiments of the present application provides a voice skill starting apparatus, where the apparatus is located in an electronic device including at least one third-party voice skill and a built-in voice skill, and the electronic device is currently in the built-in voice skill, and the apparatus includes:

an instruction receiving module, configured to receive a current demand instruction of a user; an entry instruction judging module, configured to judge whether the current demand instruction belongs to an entry demand instruction corresponding to the third-party voice skill according to a mapping relationship in response to the current demand instruction, where the mapping relationship is a pre-established mapping relationship between the third-party voice skill and the entry demand instruction, the mapping relationship is determined according to skill-associated characteristic data of a first historical demand instruction under each third-party voice skill, and the first historical demand instruction is located in the built-in voice skill; and a skill switching module, configured to switch from the built-in voice skill to the third-party voice skill if it is determined that the current demand instruction belongs to the entry demand instruction corresponding to the third-party voice skill.

Further, the apparatus as described above further includes: an instruction obtaining module, configured to obtain the first historical demand instruction in the built-in voice skill; a characteristic data determining module, configured to determine the skill-associated characteristic data of the first historical demand instruction under each third-party voice skill; an instruction filtering module, configured to obtain the entry demand instruction corresponding to each third-party voice skill by filtering the first historical demand instruction according to the skill-associated characteristic data; and a mapping relationship establishing module, configured to establish the mapping relationship between each third-party voice skill and the corresponding entry demand instruction.

Further, the apparatus as described above further includes: a mapping skill determining module, configured to judge whether there is one third-party voice skill corresponding to each entry demand instruction; if there are multiple third-party voice skills corresponding to an entry demand instruction, determine an occurrence frequency of that entry demand instruction in each corresponding third-party voice skill; and determine a third-party voice skill with the highest occurrence frequency as the third-party voice skill that has the mapping relationship with that entry demand instruction.

Further, in the apparatus as described above, the characteristic data determining module is configured to: determine skill-associated entry characteristic data of the first historical demand instruction under each third-party voice skill; and determine skill satisfaction data of a second historical demand instruction in the first historical demand instruction under each third-party voice skill.

Further, in the apparatus described above, the instruction filtering module is configured to: obtain the second historical demand instruction corresponding to each third-party voice skill by filtering the first historical demand instruction according to the skill-associated entry characteristic data; and obtain the entry demand instruction corresponding to each third-party voice skill by filtering the second historical demand instruction according to the skill satisfaction data.

Further, in the apparatus described above, the instruction filtering module, when obtaining the second historical demand instruction corresponding to each third-party voice skill by filtering the first historical demand instruction according to the skill-associated entry characteristic data, is configured to: input the skill-associated entry characteristic data of the first historical demand instruction into a trained-to-converged classification model corresponding to each third-party voice skill for classifying the first historical demand instruction by the classification model to obtain the second historical demand instruction corresponding to each third-party voice skill.

Further, in the apparatus described above, the instruction filtering module, before inputting the skill-associated entry characteristic data of the first historical demand instruction into the trained-to-converged classification model corresponding to each third-party voice skill, is further configured to: obtain a training sample of each classification model, where the training sample is a demand instruction sample, and the demand instruction sample has an identifier for identifying whether a demand instruction is capable of being used as the entry demand instruction corresponding to the third-party voice skill; and train the corresponding classification model by using skill-associated entry characteristic data of the training sample until convergence, to obtain each trained-to-converged classification model.

The skill-associated entry characteristic data includes: entry behavior characteristic data, skill correlation characteristic data, and entry grammar characteristic data.

Further, in the apparatus described above, the skill satisfaction data includes content satisfaction or interaction satisfaction, and the characteristic data determining module, when determining the skill satisfaction data of the second historical demand instruction in the first historical demand instruction under each third-party voice skill, is configured to: judge whether each third-party voice skill is a resource skill; if a third-party voice skill is the resource skill, determine a content satisfaction of the second historical demand instruction under that third-party voice skill; and if a third-party voice skill is a non-resource skill, determine an interaction satisfaction of the second historical demand instruction under that third-party voice skill.

Further, in the apparatus as described above, the characteristic data determining module, when determining the content satisfaction of the second historical demand instruction under that third-party voice skill, is configured to: obtain a first playback resource duration of the second historical demand instruction under that third-party voice skill and a second playback resource duration of the second historical demand instruction under the built-in voice skill; and determine the content satisfaction according to the first playback resource duration and the second playback resource duration.

Further, in the apparatus as described above, the characteristic data determining module, when determining the interaction satisfaction of the second historical demand instruction under that third-party voice skill, is configured to: obtain text of a multi-round conversation corresponding to the second historical demand instruction under that third-party voice skill; determine a skill response satisfaction and a skill response repetition rate of the second historical demand instruction under that third-party voice skill according to the text of the multi-round conversation; and determine the interaction satisfaction according to the skill response satisfaction and the skill response repetition rate.

Further, in the apparatus described above, the instruction filtering module, when obtaining the entry demand instruction by filtering the second historical demand instruction according to the skill satisfaction data, is configured to: if a third-party voice skill is the resource skill, obtain the entry demand instruction by filtering the second historical demand instruction according to a content satisfaction of the second historical demand instruction under that third-party voice skill; and if a third-party voice skill is a non-resource skill, obtain the entry demand instruction by filtering the second historical demand instruction according to an interaction satisfaction of the second historical demand instruction under that third-party voice skill after it is determined that there is no playback resource record corresponding to the second historical demand instruction in the built-in voice skill.

A third aspect of the embodiments of the present application provides an electronic device, including: at least one processor; and a memory, communicatively connected with the at least one processor; where The memory stores instructions executable by the at least one processor, and the instruction is executed by the at least one processor to enable the at least one processor to perform the method according to any one of the first aspect.

A fourth aspect of the embodiments of the present application provides a non-transitory computer-readable storage medium storing computer instructions, where the computer instructions are used to cause a computer to execute the method according to any one of the first aspect.

A fifth aspect of the present application provides a voice skill starting method, where the method is applied to an electronic device including at least one third-party voice skill and a built-in voice skill, and the method includes:

obtaining a current demand instruction of a user; judging whether the current demand instruction belongs to an entry demand instruction corresponding to the third-party voice skill according to a mapping relationship, where the mapping relationship is a pre-established mapping relationship between the third-party voice skill and the entry demand instruction, and the mapping relationship is determined according to skill-associated characteristic data of a first historical demand instruction under each third-party voice skill; and starting the third-party voice skill if it is determined that the current demand instruction belongs to the entry demand instruction corresponding to the third-party voice skill.

BRIEF DESCRIPTION OF DRAWINGS

The drawings are used to better understand the solution, and do not constitute a limitation on the present application, where.

DESCRIPTION OF EMBODIMENTS

The following describes exemplary embodiments of the present application with reference to the accompanying drawings, which include various details of the embodiments of the present application to facilitate understanding, and they should be considered as merely exemplary. Therefore, those of ordinary skilled in the art should recognize that various changes and modifications can be made to the embodiments described herein without departing from the scope and spirit of the application. Also, for clarity and conciseness, descriptions of well-known functions and structures are omitted in the following description.

In order to clearly understand the technical solution of the present application, the device and terminology involved in the present application are explained below:

An intelligent voice interaction device is a smart device that realizes a human-computer interaction by voice, such as a smart voice home device, a terminal device. The smart voice home device can be a smart speaker, a smart television, a smart refrigerator, and the like. The terminal device can be a smart phone, a car-mounted terminal, a wearable device, and the like. The intelligent voice interaction device can recognize a user's voice request instruction and respond accordingly.

A built-in voice skill is a voice skill that comes with the smart voice interaction device, such as a music playback skill and recording skill of the smart speaker, television program live broadcast and playing skills of the smart television.

A third-party voice skill is a variety of voice skills that can be easily and efficiently developed by a third-party developer on a skill platform, when the platform is opened to the developer by the intelligent voice interaction device. The third-party voice skill can be loaded into the intelligent voice interaction device to respond to user's requirements, it is, for example, an encyclopedia query voice skill, a game voice skill, and the like, that is installed in the smart speaker.

Figure 1:
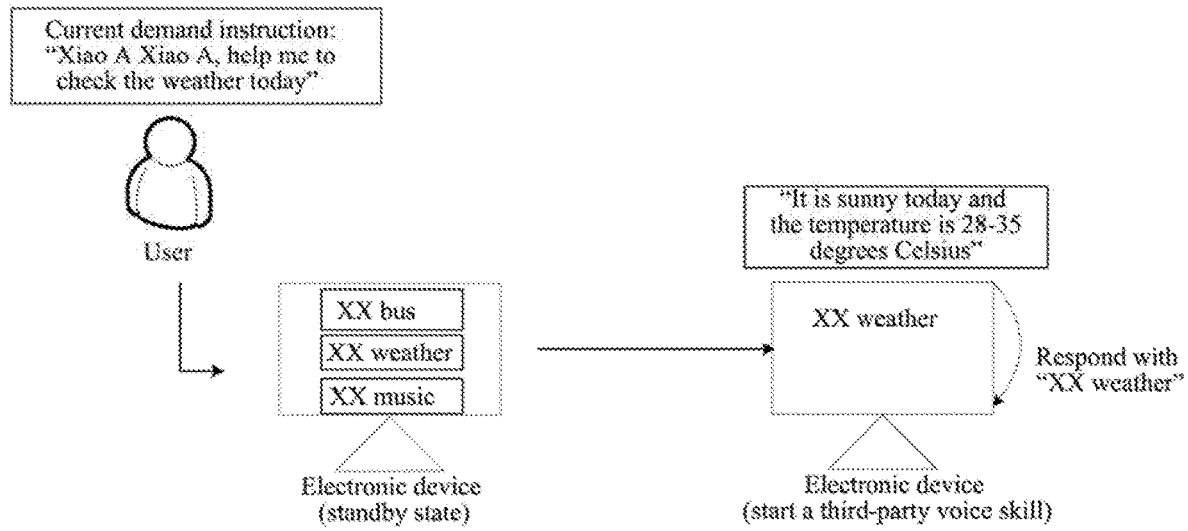
FIG. 1 is a first scenario diagram that can implement a voice skill starting method according to an embodiment of the present application.

First, an application scenario of a voice skill starting method provided in an embodiment of the present application is described by taking an electronic device acting as an intelligent voice interaction device as an example. As shown in FIG. 1, in the present application scenario, the intelligent voice interaction device includes at least one built-in voice skill and at least one third-party voice skill. The intelligent voice interaction device can currently be in a standby state, that is, a state in which no voice skill is started. In order to start a voice skill that best satisfies the user's requirements and respond to the user's requirements, the user does not take an obvious entry demand command that instructs to open a certain voice skill, but directly propose a command according to which a response is desired. For example, the user gives an entry demand instruction of "Xiao A Xiao A, help me to check the weather today". Then, in order to make the third-party voice skill to compete fairly with the built-in skill in the present application, a mapping relationship between the third-party voice skill and the entry demand instruction is pre-set, and a mapping relationship between the built-in voice skill and the entry demand instruction may also be set. After a current demand instruction is obtained, it is judged whether the current demand instruction belongs to an entry demand instruction corresponding to a third-party voice skill, and it may also judge whether the current demand instruction belongs to an entry demand instruction corresponding to a built-in voice skill. If the current demand instruction is determined to belong to an entry demand instruction corresponding to a third-party voice skill, then that third-party voice skill is started; and if the current demand instruction is determined to belong to an entry demand instruction corresponding to a built-in voice skill, then that built-in voice skill is started. Since the mapping relationship between the third-party voice skill and the entry demand instruction is determined according to skill-associated characteristic data of a first historical demand instruction under each third-party voice skill, and the first historical demand instruction is a demand instruction located in the built-in voice skill. That is, the entry demand instruction of the third-party voice skill is filtered from the first historical demand instruction of the built-in voice skill. A filtering principle is whether the first historical demand instruction can be used as the entry demand instruction, and whether the first historical demand instruction has a stronger correlation with the third-party voice skill than the built-in voice skill. The filtering principle is reflected by the skill-associated characteristic data of the first historical demand instruction under each third-party voice skill. Therefore, after the current demand instruction is determined to belong to an entry demand instruction corresponding to a third-party voice skill, and that third-party voice skill is started, the third-party voice skill is a voice skill that better satisfies the user's requirements. As shown in FIG. 1, if the voice skill in the intelligent voice interaction device includes built-in voice skills "XX music" and "XX bus" and a third-party voice skill "XX weather", after the user says "Xiao A Xiao A, help me to check the weather today", then "XX weather" is started to respond and a response speech "It is sunny today and the temperature is 28-35 degrees Celsius" is outputted.

Figure 2:
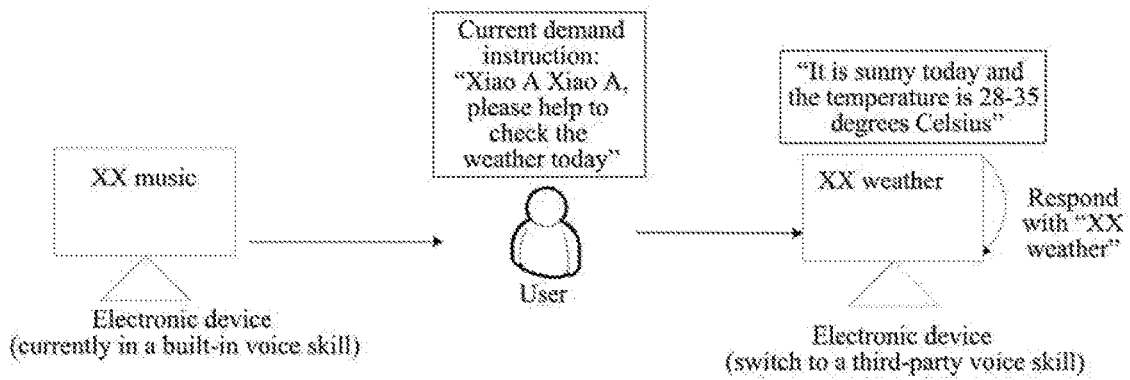
FIG. 2 is a second scenario diagram that can implement a voice skill starting method according to an embodiment of the present application.

Further, as shown in FIG. 2, if an intelligent voice interaction device is not in a standby state and is currently in a built-in voice skill, the voice skill starting method provided in the present application may also be applied in a scenario shown in FIG. 2. In the built-in voice skill, the user gives a current demand instruction, and the intelligent voice interaction device receives the current demand instruction of the user. In order to make a third-party voice skill to fairly compete with the current built-in voice skill, a voice skill that best satisfies the user's requirements responds. The intelligent voice interaction device judges the current demand instruction to determine whether it is an entry demand instruction corresponding to a third-party voice skill. If it is the entry demand instruction corresponding to that third-party voice skill, then it is switched from the built-in voice skill to that third-party voice skill, and the third-party voice skill is controlled to respond to the current demand instruction. Since when it is judged whether the current demand instruction belongs to an entry demand instruction corresponding to a third-party voice skill, it is determined according to a pre-established mapping relationship between a third-party voice skill and an entry demand instruction, the mapping relationship is determined according to skill-associated characteristic data of a first historical demand instruction under each third-party voice skill, and the first historical demand instruction is a demand instruction located in the built-in voice skill. That is, the entry demand instruction of the third-party voice skill is filtered from the first historical demand instruction of the built-in voice skill. A filtering principle is whether the first historical demand instruction can be used as the entry demand instruction, and whether the first historical demand instruction has a stronger correlation with the third-party voice skill than the built-in voice skill. The filtering principle is reflected by the skill-associated characteristic data of the first historical demand instruction under each third-party voice skill. Therefore, it is determined that the current demand instruction belongs to an entry demand instruction corresponding to a third-party voice skill, it indicates that the current demand instruction is more suitable for the corresponding third-party voice skill to respond. After it is switched from the current built-in voice skill to the third-party voice skill, the third-party voice skill can provide a response that better satisfies the user's requirements. As shown in FIG. 2, if the current built-in voice skill of the intelligent voice interaction device includes a built-in voice skill "XX music", after the user gives a current demand instruction "Xiao A Xiao A, please help to check the weather today", then it is switched from "XX music" to the third-party voice skill "XX weather" to respond, and a response speech "It is sunny today and the temperature is 28-35 degrees Celsius" is outputted.

Hereinafter, the embodiments of the present application will be described in detail with reference to the drawings.

Embodiment 1

Figure 3:
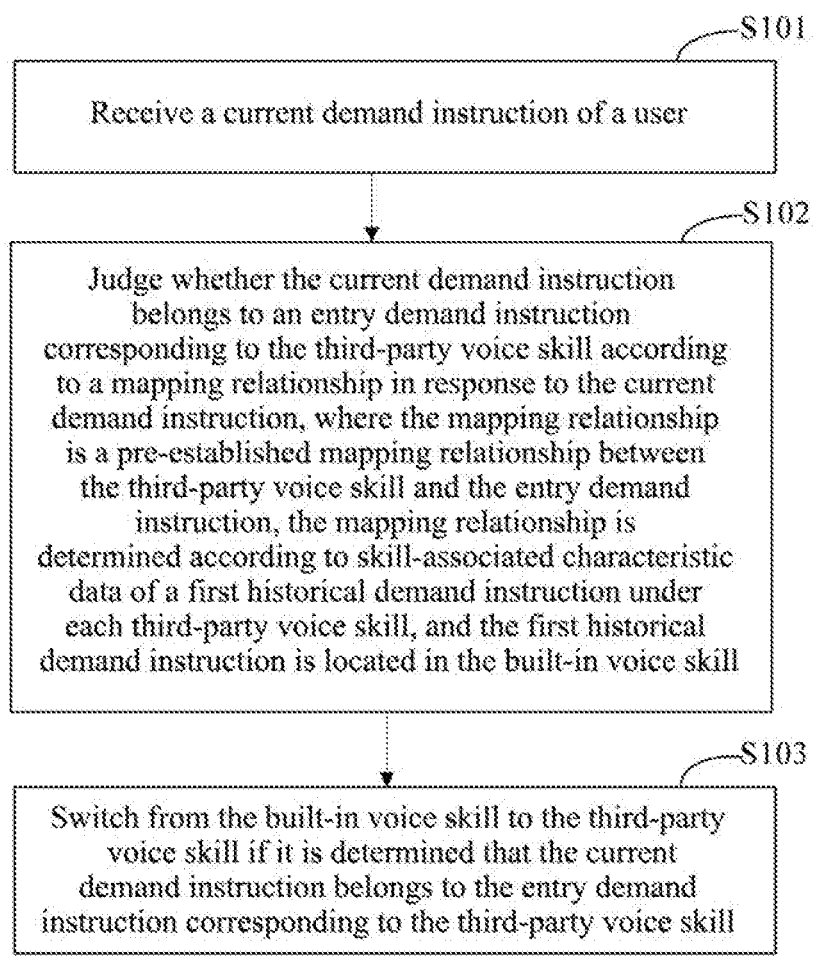
FIG. 3 is a schematic flowchart of a voice skill starting method provided according to a first embodiment of the present application.

FIG. 3 is a schematic flowchart of a voice skill starting method provided according to a first embodiment of the present application. As shown in FIG. 3, an executive body of the embodiment of the present application is a voice skill starting apparatus. The voice skill starting apparatus may be integrated in an electronic device. The electronic device includes: multiple voice skills, including: at least one third-party voice skill and a built-in voice skill, the electronic device is currently in the built-in voice skill. The embodiment is described by taking an electronic device being an intelligent voice interaction device as an example. Then, the voice skill starting method provided in this embodiment includes the following steps.

Step 101, receive a current demand instruction of a user.

In this embodiment, the electronic device may include a radio component and a playback component. A voice of the demand instruction given by the user is received through the radio component, and a voice in response to the demand instruction is played through the playback component.

In this embodiment, the electronic device is in the built-in voice skill. The current demand instruction of the user can be received through the radio component, and a voice recognition is performed on the current demand instruction to determine semantic information of the current demand instruction.

Step 102, judge whether the current demand instruction belongs to an entry demand instruction corresponding to the third-party voice skill according to a mapping relationship in response to the current demand instruction, where the mapping relationship is a pre-established mapping relationship between the third-party voice skill and the entry demand instruction, the mapping relationship is determined according to skill-associated characteristic data of a first historical demand instruction under each third-party voice skill, and the first historical demand instruction is located in the built-in voice skill.

In this embodiment, the current demand instruction is matched with each entry demand instruction in the pre-established mapping relationship between the third-party voice skill and the entry demand instruction. If the current demand instruction matches an entry demand instruction of a third-party voice skill, then it is determined that the current demand instruction belongs to the entry demand instruction corresponding to the matched third-party voice skill.

In this embodiment, the pre-established mapping relationship between the third-party voice skill and the entry demand instruction is determined according to the skill-associated characteristic data of the first historical demand instruction under each third-party voice skill. The skill-associated characteristic data of the first historical demand instruction under each third-party voice skill reflects whether the first historical demand instruction can be used as the entry demand instruction, and whether the first historical demand instruction has a stronger correlation with each third-party voice skill than the built-in voice skill.

A strength of the correlation between the demand instruction and the voice skill can indicate whether the voice skill can provide the demand instruction with a response that better satisfies the user's requirements. Therefore, if it can be used as the entry demand instruction for the third-party voice skill, then after entering the third-party voice skill from the entry demand instruction, the third-party voice skill can provide the user with a response that better satisfies the user's requirements than the built-in voice skill.

Step 103, switch from the built-in voice skill to the third-party voice skill if it is determined that the current demand instruction belongs to the entry demand instruction corresponding to the third-party voice skill.

If the current demand instruction is determined to belong to an entry demand instruction corresponding to a third-party voice skill, it indicates that the third-party voice skill can be started. Since the electronic device is in the built-in voice skill, it is switched from the built-in voice skill to the third party voice skill.

In this embodiment, after it is switched from the built-in voice skill to the third-party voice skill, it may be controlled, so that when the third-party voice skill responds to the current demand instruction, the third-party voice skill obtains a response speech corresponding to the current demand instruction, and the response speech is played by the playback component.

If the electronic device has a display component, the playback component and the display component can also be linked, so that a content of the response speech is displayed on the playback component when the response speech is outputted in the form of voice.

It can be understood that, since the current demand instruction has a stronger correlation with the third-party voice skill that respond, the response by using the third-party voice skill can better satisfy the user's requirements than using the current built-in voice skill.

In the voice skill starting method provided in this embodiment, a current demand instruction of a user is received; it is judged whether the current demand instruction belongs to an entry demand instruction corresponding to the third-party voice skill according to a mapping relationship in response to the current demand instruction, where the mapping relationship is a pre-established mapping relationship between the third-party voice skill and the entry demand instruction, the mapping relationship is determined according to skill-associated characteristic data of a first historical demand instruction under each third-party voice skill, and the first historical demand instruction is located in the built-in voice skill; and it is switched from the built-in voice skill to the third-party voice skill if it is determined that the current demand instruction belongs to the entry demand instruction corresponding to the third-party voice skill. When the electronic device is currently in the built-in voice skill, it is judged whether the current demand instruction belongs to the entry demand instruction of the third-party voice skill, which can enable the third-party voice skill to compete fairly with the current built-in voice skill. And since the entry demand instruction having the mapping relationship with the third-party voice skill is obtained by filtering the first historical demand instruction according to the skill-associated characteristic data of the first historical demand instruction under each third-party voice skill, and a correlation between the entry demand instruction and the third-party voice skill is stronger than a correlation between the entry demand instruction and the built-in voice skill, hence when it is determined that the current demand instruction is an entry demand instruction of a third-party voice skill, and user's requirements are better satisfied by a response of the third-party voice skill than a response of the current built-in voice skill.

Embodiment 2

Figure 4:
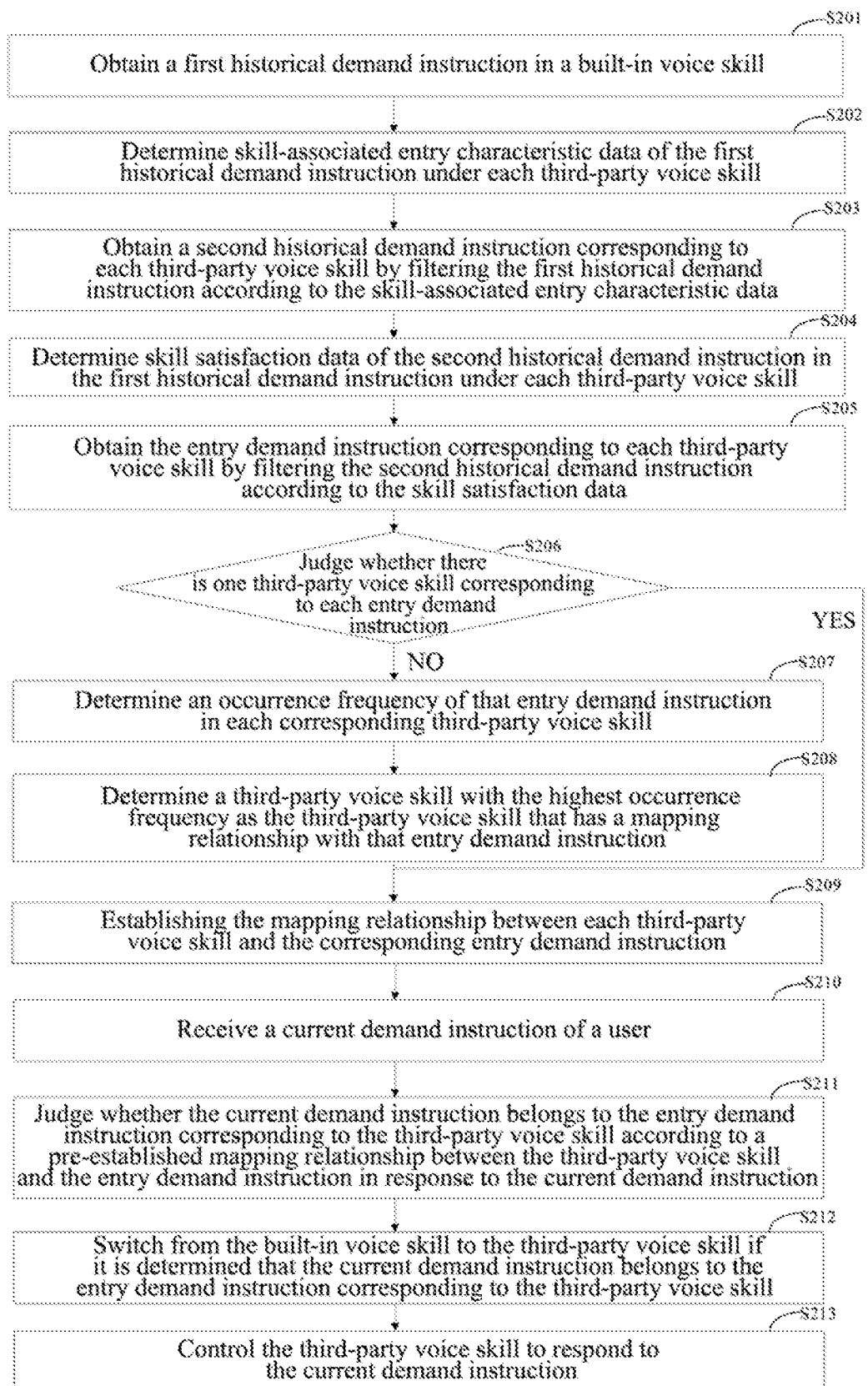
FIG. 4 is a schematic flowchart of a voice skill starting method provided according to a second embodiment of the present application.

FIG. 4 is a schematic flowchart of a voice skill starting method provided according to a second embodiment of the present application. As shown in FIG. 4, the voice skill starting method provided in this embodiment is based on the voice skill starting method provided in Embodiment 1 of the present application, and further includes a step of establishing a mapping relationship between a third-party voice skill and an entry demand instruction. Then, the voice skill starting method provided in this embodiment includes the following steps.

Step 201, obtain a first historical demand instruction in a built-in voice skill.

In this embodiment, an electronic device may include at least one built-in voice skill, and the first historical demand instruction is a demand instruction that has occurred in all the built-in voice skills. There may be multiple first historical demand instructions.

A method for obtaining the first historical demand instruction in the built-in voice skill may be: obtain a natural context from a log file of each built-in voice skill, and obtaining the first historical demand instruction from the natural context.

The natural context is a context of a human-machine interaction conversation, and includes a context of multi-round conversation.

Step 202, determine skill-associated entry characteristic data of the first historical demand instruction under each third-party voice skill.

It is worth noting that the step 202 and the step 204 are steps of determining skill-associated characteristic data of the first historical demand instruction under each third-party voice skill.

Further, in this embodiment, since the first historical demand instruction is a demand instruction in the built-in voice skill, the first historical demand instruction may also occur in each third-party voice skill. However, the skill-associated characteristic data of the first historical demand instruction under each kind of third-party voice skill will be different, therefore, the skill-associated characteristic data of the first historical demand instruction under each third-party voice skill is determined respectively.

First, the skill-associated entry characteristic data of the first historical demand instruction under each third-party voice skill is determined. When determining the skill-associated entry characteristic data of the first historical demand instruction under each third-party voice skill, the skill-associated entry characteristic data under each third-party voice skill is determined for each first historical demand instruction.

The skill-associated entry characteristic data is data associated with the third-party voice skill and representing a characteristic of the entry demand instruction. In an embodiment, the skill-associated entry characteristic data includes: entry behavior characteristic data, skill correlation characteristic data, and entry grammar characteristic data.

In an embodiment, the entry behavior characteristic data may include: a frequency of the first historical demand instruction as the entry demand instruction in the natural context of the voice skill, a frequency of the first historical demand instruction being a first demand instruction after all third-party voice skills are opened, whether the first historical demand instruction hitting an instruction intention, and the like.

A method for determining the frequency of the first historical demand instruction as the entry demand instruction in the natural context of the voice skill is: obtaining all natural contexts under all voice skills, and analyzing the natural context, and obtaining a first demand instruction of the natural context, which is an entry demand instruction of the natural context, determining whether the first historical demand instruction is the entry demand instruction corresponding to the voice skill, that is, determining whether the first historical demand instruction is the first demand instruction in the natural context of the corresponding voice skill, and counting a frequency of the first historical demand instruction being the first demand instruction corresponding to the voice skill to determine the frequency of the first historical demand instruction as the entry demand instruction in the natural context of the voice skill.

A method for determining the frequency of the first historical demand instruction being the first demand instruction after all third-party voice skills are opened is: obtaining a log file of all third-party voice skills, and obtaining a first demand instruction for opening the third-party voice skills from the log file, judging whether the first historical demand instruction is the first demand instruction, and counting the number of times that the first historical demand instruction is the first demand instruction to obtain the frequency of the first historical demand instruction being the first demand instruction after all third-party voice skills are opened.

The method for determining whether the first historical demand instruction hits the instruction intention is: first determining a keyword that indicates the instruction intention, such as "exit", "return", "shut down", "start", and the like, then matching the first historical demand instruction with the keyword of the instruction intention. If the first historical demand instruction matches the keyword of the instruction intention, it indicates that the first historical demand instruction hits the instruction intention, otherwise it is determined that the first historical demand instruction does not hit the instruction intention.

In an embodiment, the skill correlation characteristic data includes: the number of all third-party voice skills where the first historical demand instruction occurs; whether a response of the first historical demand instruction in the corresponding third-party voice skill is empty; "tfidf" information of the first historical demand instruction in the corresponding third-party voice skill; whether a response speech of the first historical demand instruction in the corresponding third-party voice skill is a high-satisfied speech; a ratio of the first historical demand instruction being a high-frequency demand instruction in the corresponding third-party voice skill; a frequency-associated characteristic of the first historical demand instruction occurring inside and outside the corresponding third-party voice skill, and the like.

Although the first historical demand instruction is a historical demand instruction in the built-in voice skill, the first historical demand instruction may also occur in the third-party voice skill. Therefore, the number of all third-party voice skills for one historical demand instruction is determined by judging from the log file of each third-party voice skill whether the first historical demand instruction occurs, and counting the number of the third-party voice skill where the first historical demand instruction occurs.

The "tfidf" information of the first historical demand instruction in the corresponding third-party voice skill refers to internal and external proportion distribution information of the first historical demand instruction in the corresponding third-party voice skill. It can be calculated through existing methods.

A method of determining whether the response speech of the first historical demand instruction in the corresponding third-party voice skill is a high-satisfied speech is: first training a prediction model of satisfaction response speech, inputting the response speech of the first historical demand instruction in the corresponding third-party voice skill into the prediction model of the satisfaction speech response that has been trained to convergence, and using the prediction model to predict whether the response speech is a high-satisfied speech. The prediction model of the satisfaction response speech can be a logistic regression model. If an output of the logistic regression model is 1, it is determined that the response speech of the first historical demand instruction in the corresponding third-party voice skill is a high-satisfied speech. If the output of the logistic regression model is 0, it is not determined to be a high-satisfied response speech.

The method for determining the ratio of the first historical demand instruction being the high-frequency demand instruction in the corresponding third-party voice skill is: obtaining log file of all voice skills, obtaining anterior N demand instruction with a high occurrence frequency, where the anterior N demand instruction with a high occurrence frequency is the high-frequency demand instruction, then determining a frequency of the first historical demand instruction belonging to the high-frequency demand instruction in the third-party voice skill, and determining a ratio of the frequency of the first historical demand instruction belongs to the high-frequency demand instruction in the third-party voice skill to an occurrence frequency of the high-frequency demand instruction as the ratio of the first historical demand instruction being the high-frequency demand instruction in the corresponding third-party voice skill.

The frequency-associated characteristic of the first historical demand instruction occurring inside and outside the corresponding third-party voice skill includes: a frequency of the first historical demand instructions occurring in the built-in voice skill, a frequency of the first historical demand instruction occurring in the corresponding third-party voice skill, a difference between the frequency of the first historical demand instructions occurring in the built-in voice skill and the frequency of the first historical demand instruction occurring in the corresponding third-party voice skill, a ratio between frequency of the first historical demand instructions occurring in the built-in voice skill and the frequency of the first historical demand instruction occurring in the corresponding third-party voice skill.

In an embodiment, the entry grammar characteristic data is a characteristic parsed from the first historical demand instruction itself, and may include that: whether a wantkey is included, whether an intention predicate is included, whether it is a single or double word instruction, whether a high-frequency word is included, and the like.

The method for determining whether a wantkey is included may be: first setting the wantkey, for example, the wantkey set is: "I want to go", "I want to listen", "I want to see" and the like, and comparing the first historical demand instruction with the preset wantkey to determine whether the wantkey is included.

A method for determining whether an intention predicate is included may be: firstly setting the intention predicate, for example, the set intention predicate may include: "watch", "listen", "eat" and the like, and comparing the first historical demand instruction with the preset intention predicate to determine the intention predicate is included.

The method for determining whether it is a single or double word instruction is: obtaining the first historical demand instruction, determining the number of a word included in the first historical demand instruction, if it is greater than two, determining that it is not a single or double word instruction, otherwise determining to be a single or double word instruction.

A method for determining whether a high-frequency word is included is: determining all words occurring in the historical demand instruction, and determining a high-frequency word that occurs in a high frequency, and comparing the first historical demand instruction with the high-frequency word to determine whether the high-frequency words are included.

Step 203, obtain a second historical demand instruction corresponding to each third-party voice skill by filtering the first historical demand instruction according to the skill-associated entry characteristic data.

Figure 5:
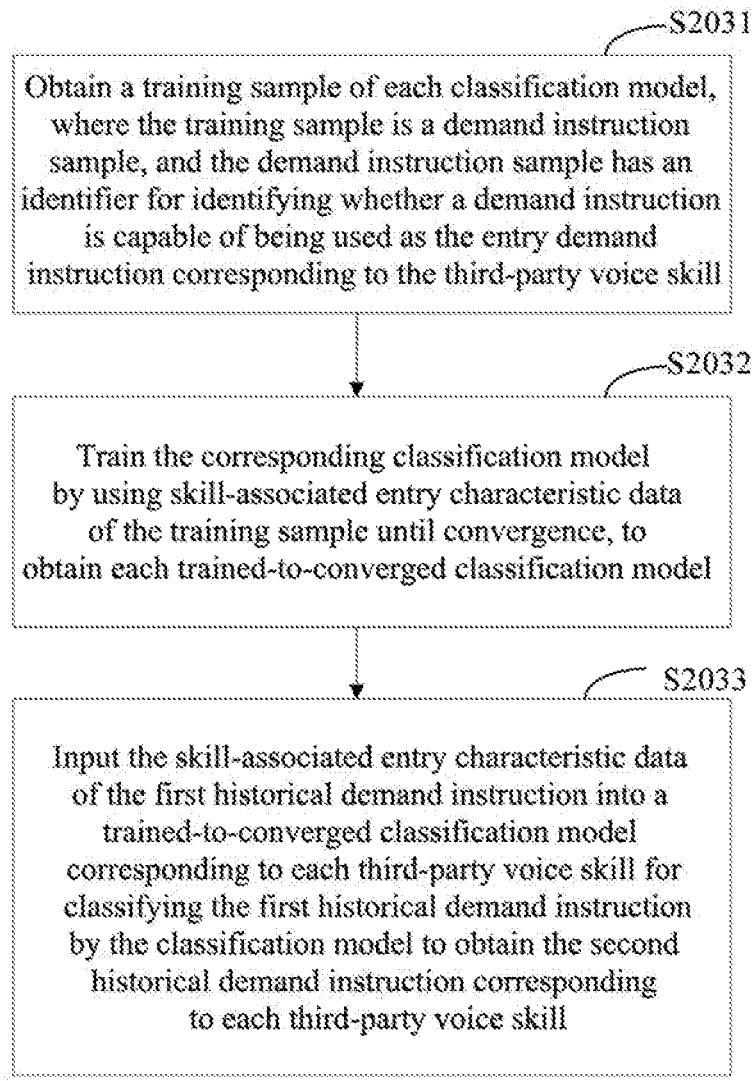
FIG. 5 is a schematic flowchart of step 203 in the voice skill starting method provided according to the second embodiment of the present application.

Further, FIG. 5 is a schematic flowchart of step 203 in the voice skill starting method provided according to the second embodiment of the present application. As shown in FIG. 5, step 203 may include the following steps.

Step 2031, obtain a training sample of each classification model, where the training sample is a demand instruction sample, and the demand instruction sample has an identifier for identifying whether a demand instruction is capable of being used as the entry demand instruction corresponding to the third-party voice skill.

Step 2032, train the corresponding classification model by using skill-associated entry characteristic data of the training sample until convergence, to obtain each trained-to-converged classification model.

There is a corresponding classification model for each third-party voice skill. First each classification model is trained. The demand instruction sample is obtained when the classification model is trained. For each demand instruction, it is annotated with an identifier for identifying whether it can be used as the entry demand instruction of the corresponding third-party voice skill. If it can be used as the entry demand instruction of the corresponding third-party voice skill, the identifier is 1, otherwise the identifier is 0. Then the skill-associated entry characteristic data of each training sample under each third-party voice skill is determined by using the demand instruction sample as a training sample. The skill-associated entry characteristic data of each training sample is entered into the corresponding classification model to train the classification model to optimize a parameter in the classification model until a maximum number of iterations is reached to make the classification model converge, and obtain the trained-to-converged classification model.

In an embodiment, the classification model may be a machine learning model or a deep learning model. In this embodiment, the classification model is a Gradient Boosting Decision Tree (GBDT) classification model.

In the embodiment of the present application, the demand instruction sample with identification information is used as the training sample of the classification model, which can make the trained classification model more suitable for the test sample, thereby causing the classification result more accurate.

Step 2033, input the skill-associated entry characteristic data of the first historical demand instruction into a trained-to-converged classification model corresponding to each third-party voice skill for classifying the first historical demand instruction by the classification model to obtain the second historical demand instruction corresponding to each third-party voice skill.

It is worth noting that skill association entry characteristic data of the same first historical demand instruction under different third-party voice skills will be different, therefore the skill-associated entry characteristic data of the first historical demand instruction is inputted into the trained-to-converged classification model corresponding to each third-party voice skill, the trained-to-converged classification model classifies the first historical demand instruction according to the skill-associated entry characteristic data of the first historical demand instruction. If a value of a classification result of a first historical demand instruction is greater than a preset classification value, it indicates that that first historical demand instruction is a filtered second historical demand instruction. If the value of the classification result of that first historical demand instruction is less than or equal to the preset classification value, it indicates that that first historical demand instruction is a historical demand instruction that needs to be removed after filtering.

The second historical demand instruction is a historical demand instruction filtered from the first historical demand instruction according to the skill-associated entry characteristic data.

In the embodiment of the present application, for each third-party voice skill, there is a corresponding trained-to-converged classification model, and the trained-to-converged classification model is used to filter the first historical demand instruction to obtain the second historical demand instruction, which can make the filtered second historical demand instruction to better satisfy a demand instruction of an entry characteristic corresponding to the third-party voice skill.

Step 204, determine skill satisfaction data of the second historical demand instruction in the first historical demand instruction under each third-party voice skill.

The skill satisfaction data indicates characteristic data of whether the third-party voice skill can satisfy the second historical demand instruction. In an embodiment, the skill satisfaction data may be: content satisfaction or interaction satisfaction.

Figure 6:
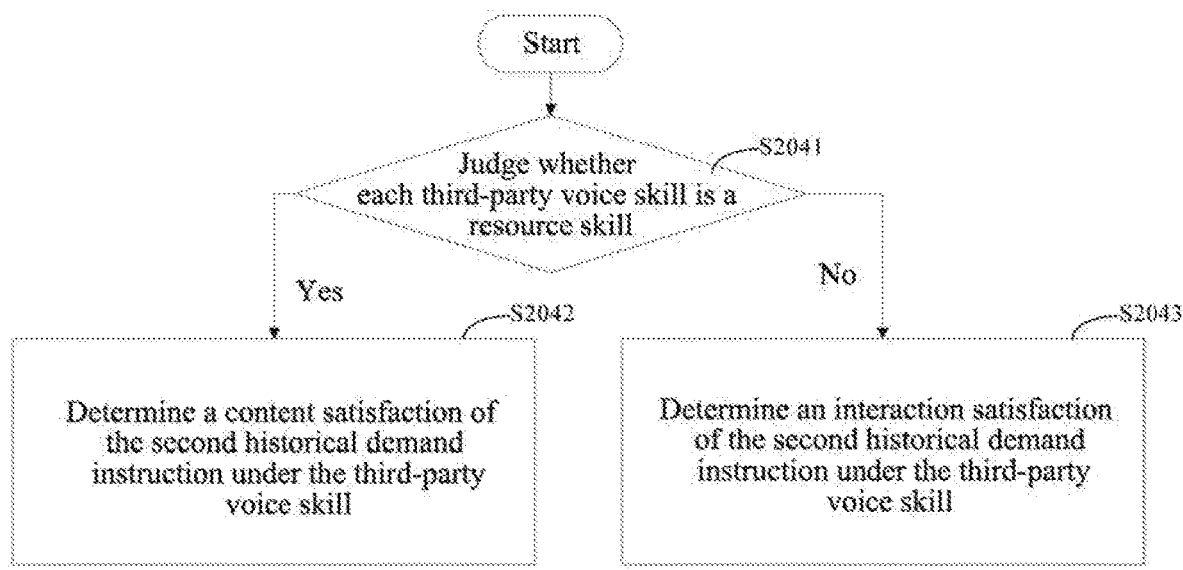
FIG. 6 is a schematic flowchart of step 204 in the voice skill starting method provided according to the second embodiment of the present application.

Further, FIG. 6 is a schematic flowchart of step 204 in the voice skill starting method provided according to the second embodiment of the present application. As shown in FIG. 6, step 204 may include the following steps.

Step 2041, judge whether each third-party voice skill is a resource skill; if it is, proceed to step 2042, otherwise proceed to step 2043.

The resource skill may include: an audio skill, a video skill, and a speech synthesis skill (referred to as a Text To Speech (TTS) skill), and the like.

In this embodiment, each type identifier of the resource skill is pre-stored to obtain a type identifier of each third-party voice skill, and the type identifier of each third-party voice skill is matched with each type identifier, that is pre-stored, of the resource skill. If a type identifier of a third-party voice skill matches a pre-stored type identifier of a resource skill, then that third-party voice skill is determined to be a resource skill, otherwise the third-party voice skill is determined to be a non-resource skill.

Step 2042, determine a content satisfaction of the second historical demand instruction under the third-party voice skill.

If a third-party voice skill is the resource skill, a content satisfaction of the second historical demand instruction under that third-party voice skill is determined.

Figure 7:
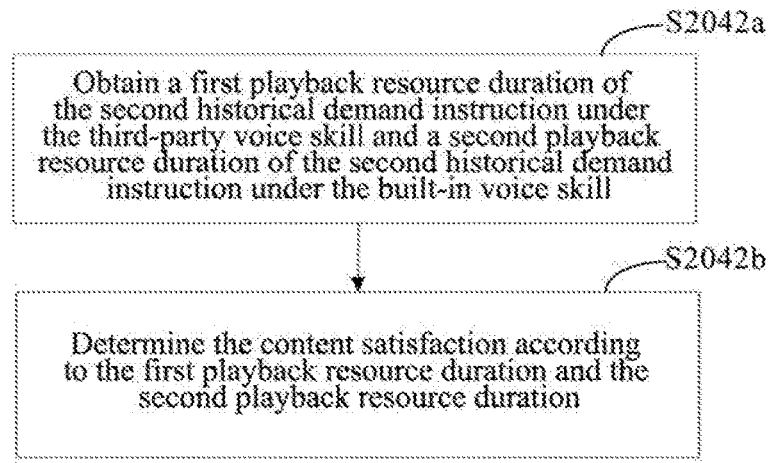
FIG. 7 is a schematic flowchart of step 2042 in the voice skill starting method provided according to the second embodiment of the present application.

In this embodiment, FIG. 7 is a schematic flowchart of step 2042 in the voice skill starting method provided according to the second embodiment of the present application. As shown in FIG. 7, step 2042 may include the following steps.

Step 2042a, obtain a first playback resource duration of the second historical demand instruction under the third-party voice skill and a second playback resource duration of the second historical demand instruction under the built-in voice skill.

In this embodiment, a corresponding playback resource duration of the second historical demand instruction under the third-party voice skill is obtained from a historical log of the third-party voice skill, and the corresponding playback resource duration under the third-party voice skill is the first playback resource duration. A corresponding playback resource duration of the second historical demand instruction under the built-in voice skill is obtained from a historical log of the built-in voice skill, and the corresponding playback resource duration under the built-in voice skill is the second playback resource duration.

Step 2042b, determine the content satisfaction according to the first playback resource duration and the second playback resource duration.

Further, in this embodiment, the first playback resource duration is compared with the second playback resource duration, and the content satisfaction is determined according to the comparison result.

As an embodiment, the first playback resource duration is compared with the second playback resource duration, if the first playback resource duration is longer than the second playback resource duration, the content satisfaction is determined to be 1, otherwise the content satisfaction is determined to be 0.

As another embodiment, a mapping relationship between the content satisfaction and a difference between the first playback resource duration and the second playback resource duration is first set, then the difference between the first playback resource duration and the second playback resource duration is calculated, and the corresponding content satisfaction is determined according to the calculated difference and the mapping relationship. The content satisfaction is a value between 0-1.

In the embodiment of the present application, since the playback resource duration is an important indicator for measuring whether a resource voice skill satisfies the user's requirements, therefore, the content satisfaction of the second historical demand instruction under the third-party voice skill is determined according to the playback resource duration of the third-party voice skill and the playback resource duration of a built-in voice skill, so that the content satisfaction is determined more accurate.

Step 2043, determine an interaction satisfaction of the second historical demand instruction under the third-party voice skill.

In this embodiment, if a third-party voice skill is a non-resource skill, it indicates that that third-party voice skill may be a game skill or other non-resource skill. For the game skill, it can be an instruction game, a knowledge game, or other games. The non-resource skill has a characteristics of multi-round conversation.

Figure 8:
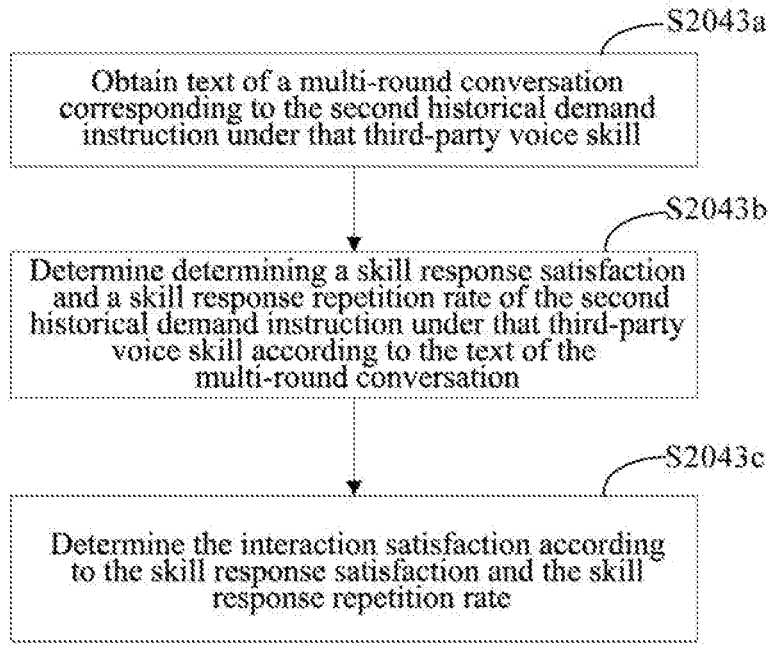
FIG. 8 is a schematic flowchart of step 2043 in the voice skill starting method provided according to the second embodiment of the present application.

In this embodiment, FIG. 8 is a schematic flowchart of step 2043 in the voice skill starting method provided according to the second embodiment of the present application. As shown in FIG. 8, step 2043 may include the following steps.

Step 2043*a*, obtain text of a multi-round conversation corresponding to the second historical demand instruction under that third-party voice skill.

In an embodiment, the text of the multi-round conversation including the second historical demand instruction is obtained from a log file under the third-party voice skill. Text of each round conversation includes a demand instruction and a corresponding response speech.

The number of round of the obtained text of the multi-round conversation may be preset or the number of round of the text of the multi-round conversation is the number of round from the third-party voice skill being entered to the third-party voice skill being exited.

Step 2043*b*, determine determining a skill response satisfaction and a skill response repetition rate of the second historical demand instruction under that third-party voice skill according to the text of the multi-round conversation.

The skill response satisfaction can be determined according to a frequency of a low-satisfaction keyword occurring in a response speech of the text of the multi-round conversation. A correspondence relationship between the frequency of the low-satisfaction keyword and the skill response satisfaction can be pre-set. The frequency of the low-satisfaction keyword occurring in the response speech of the text of the multi-round conversation is obtained, and the skill response satisfaction is determined according to the above-mentioned correspondence relationship.

If the frequency of the low-satisfaction keyword occurring in the text of the multi-round conversation is higher, the determined skill response satisfaction is lower. On the contrary, if the frequency of the low-satisfaction keyword occurring in the text of the multi-round conversation is lower, the determined skill response satisfaction is higher.

In this embodiment, the method for determining the skill response repetition rate is: obtaining a response speeches for the text of the multi-round conversation including the second historical demand instruction, comparing the response speech in each round to determine the number of repetitions of each response speech, and determining a ratio of the number of repetitions of each response speech to the total number of response speeches as the skill response repetition rate.

The skill response satisfaction and skill response repetition rate is described in the below using the third-party voice skill being a "smart guidance" as an example.

Text of a multi-round conversation including a second historical demand instruction in the smart guidance includes text of five-round conversation that recommends a registered department in response to the user's requirements in the end by asking the user's symptoms, age, gender, and type of illness. If a response speech of the "smart guidance" always includes keywords of "not knowing", "not understanding", and the like, which are obviously low in satisfaction, then it is determined that the "smart guidance" has weak understanding on the user's requirements and the skill response satisfaction is relatively low. Similarly, if the same response speech is always repeated by the "smart guidance", for example, it repeatedly asks the user's symptoms, that is, the skill response repetition rate is high, indicating that the "smart guidance" does not understand the user's needs instruction.

Step 2043*c*, determine the interaction satisfaction according to the skill response satisfaction and the skill response repetition rate.

As an embodiment, since the skill response satisfaction is positively related to the interaction satisfaction, and the skill response repetition rate is negatively related to the interaction satisfaction, the skill response repetition rate can be converted. After the skill response repetition rate is converted to be positively related to the interaction satisfaction, the interaction satisfaction is determined by weighted summing the skill response satisfaction and the skill response repetition rate.

As another embodiment, an interaction satisfaction prediction model may be trained. The skill response satisfaction and the skill response repetition rate are inputted into the interaction satisfaction prediction model, and the interaction satisfaction is predicted by the interaction satisfaction prediction model.

It can be understood that other ways may be used to determine the interaction satisfaction according to the skill response satisfaction and the skill response repetition rate, which is not limited in this embodiment.

In the embodiment of the present application, since the skill response satisfaction and the skill response repetition rate are important indicators for measuring whether an interaction voice skill satisfies the user's requirements, therefore, the interaction satisfaction is determined using the skill response satisfaction and skill response repetition rate of the second historical demand instruction under the third-party voice skill, which can make the determined interaction satisfaction more accurate.

Step 205, obtain the entry demand instruction corresponding to each third-party voice skill by filtering the second historical demand instruction according to the skill satisfaction data.

Figure 9:
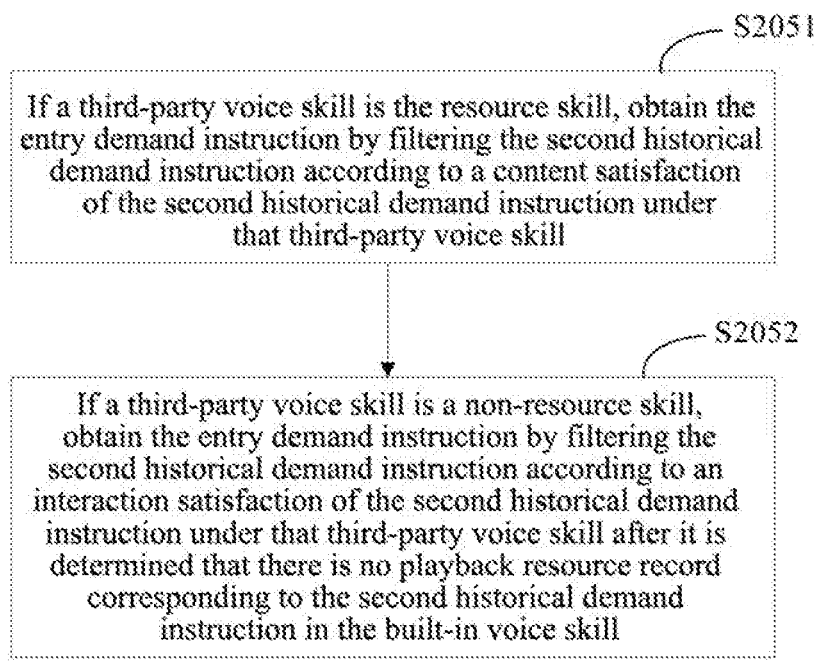
FIG. 9 is a schematic flowchart of step 205 in the voice skill starting method provided according to the second embodiment of the present application.

Further, FIG. 9 is a schematic flowchart of step 205 in the voice skill starting method provided according to the second embodiment of the present application. As shown in FIG. 9, step 205 may include the following steps.

Step 2051, if a third-party voice skill is the resource skill, obtain the entry demand instruction by filtering the second historical demand instruction according to a content satisfaction of the second historical demand instruction under that third-party voice skill.

As an embodiment, the content satisfaction of the second historical demand instruction under the third-party voice skill is obtained. If the content satisfaction only includes two values of 0 and 1, and if the content satisfaction is 1, it is determined that the second historical demand instruction is the entry demand instruction of the third-party voice skill, or if the content satisfaction is 0, it is determined that the second historical demand instruction is not the entry demand instruction of the third-party voice skill.

As another embodiment, the content satisfaction of the second historical demand instruction under the third-party voice skill is obtained. If the content satisfaction is a value between 0-1, then a content satisfaction threshold is set, such as the preset content satisfaction threshold is 0.8. If the content satisfaction is greater than the preset content satisfaction threshold, it is determined that the second historical demand instruction is the entry demand instruction of the third-party voice skill, and if the content satisfaction is less than or equal to the preset content satisfaction threshold, then it is determined that the second historical demand instruction is not the entry demand instruction of the third-party voice skill.

In this embodiment, if a third-party voice skill is a resource skill, the entry demand instruction is obtained by filtering the second historical demand instruction according to a content satisfaction of the second historical demand instruction under that third-party voice skill. Since the content satisfaction is determined based on playback resource durations of the second historical demand instruction in the third-party voice skill and built-in voice skill, therefore, a correlation between the filtered entry demand instruction and that third-party voice skill in terms of content is stronger than a correlation between the entry demand instruction and the built-in voice skill in terms of content. The filtered second historical demand instruction is more suitable to be the entry demand instruction of the third-party voice skill, so as to provide the user with a playback resource that better satisfies the user's requirements.

Step 2052, if a third-party voice skill is a non-resource skill, obtain the entry demand instruction by filtering the second historical demand instruction according to an interaction satisfaction of the second historical demand instruction under that third-party voice skill after it is determined that there is no playback resource record corresponding to the second historical demand instruction in the built-in voice skill.

Further, in this embodiment, if a third-party voice skill is a non-resource skill, then it is judged whether there is a playback resource record of the second historical demand instruction in the built-in voice skill. If there is, it indicates that the second historical demand instruction can be used as the demand instruction for a resource voice skill, and is not suitable to be used as the entry demand instruction for the non-resource skill, and the second historical demand instruction is deleted. If the second historical demand instruction does not have a corresponding playback resource record in the built-in voice skill, it indicates that the second historical demand instruction can be used as the demand instruction of the non-resource skill. Based on a characteristics of a multi-round conversation of the non-resource skill, the entry demand instruction is obtained by filtering the second historical demand instruction according to the interaction satisfaction of the second historical demand instruction under that third-party voice skill.

An interaction satisfaction threshold may be pre-set, and the interaction satisfaction of the second historical demand instruction under that third-party voice skill is compared with the preset interaction satisfaction threshold. If it is greater than the preset interaction satisfaction threshold, the second historical demand instruction is used as the entry demand instruction, and if it is less than or equal to the preset interaction satisfaction threshold, the second historical demand instruction is not used as the entry demand instruction.

In the embodiment of the present application, a characteristic basis for filtering the second historical demand instruction is determined according to the type of the third-party voice skill, which can enable the third-party voice skill to achieve effective content satisfaction or interaction satisfaction after being started according to the filtered entry demand instruction, thereby improving user satisfaction for voice skill response.

In the embodiment of the present application, the second historical demand instruction corresponding to each third-party voice skill is obtained by filtering the first historical demand instruction according to the skill-associated entry characteristic data; and the entry demand instruction corresponding to each third-party voice skill is obtained by filtering the second historical demand instruction according to the skill satisfaction data. The first historical demand instruction can be filtered for the first time by using the skill-associated entry characteristic data, and the first historical demand instruction that cannot have the characteristic of the entry demand instruction of the third-party voice skill is eliminated. The second historical demand instruction can be filtered for the second time according to the skill satisfaction data, and the second historical demand instruction that cannot be satisfied by the third voice skill is eliminated, so that the filtered entry demand instruction of each third-party voice skill is more accurate.

Step 206, judge whether there is one third-party voice skill corresponding to each entry demand instruction; if not, proceed to step 207, otherwise proceed to step 209.

In this embodiment, there are at least one entry demand instruction that can be used as an entry demand instruction of a third-party voice skill, and similar, each entry demand instruction can also be used as an entry demand instruction of at least one third-party voice skill, which results in that the current demand instruction can be matched with an entry demand instruction of at least one third-party voice skill, and thus it is impossible to determine which third-party voice skill to respond to. Therefore, if it is determined that there are multiple third-party voice skills corresponding to an entry demand instruction, only one third-party voice skill corresponding to the entry demand instruction is retained.

Step 207, determine an occurrence frequency of that entry demand instruction in each corresponding third-party voice skill.

Further, in order to retain only one third-party voice skill corresponding to the entry demand instruction, the occurrence frequency of that entry demand instruction in each corresponding third-party voice skill is determined. The higher the occurrence frequency, the stronger the correlation between that entry demand instruction and the third-party voice skill.

Step 208, determine a third-party voice skill with the highest occurrence frequency as the third-party voice skill that has the mapping relationship with that entry demand instruction.

Further, in this embodiment, the third-party voice skill with the highest occurrence frequency is determined as the third-party voice skill that has the mapping relationship with that entry demand instruction, and mapping relationships between other corresponding third-party voice skills and that entry demand instruction is removed to make that one entry demand instruction only has a mapping relationship with one third-party voice skill.

Step 209, establishing the mapping relationship between each third-party voice skill and the corresponding entry demand instruction.

Further, in this embodiment, when the mapping relationship between each third-party voice skill and the corresponding entry demand instruction is established, the mapping relationship may be established in a pair form of the entry demand instruction and the third party voice skill.

In the embodiment of the present application, it is determined that only one third-party voice skill has the mapping relationship with each entry demand instruction by the occurrence frequency of the entry demand instruction in the corresponding third-party voice skill, which can enable a switching from the currently built-in voice skill to the best third-party voice skill, thereby avoiding the problem of being unable to determine which third-party voice skill to switch to. Moreover, switching to the best third-party voice skill and responding with the best third-party voice skill further improves the satisfaction of the user's requirements.

Step 210, receive a current demand instruction of a user.

Step 211, judge whether the current demand instruction belongs to the entry demand instruction corresponding to the third-party voice skill according to a pre-established mapping relationship between the third-party voice skill and the entry demand instruction in response to the current demand instruction.

The mapping relationship is determined according to skill-associated characteristic data of the first historical demand instruction under each third-party voice skill, and the first historical demand instruction is located in the built-in voice skill.

Step 212, switch from the built-in voice skill to the third-party voice skill if it is determined that the current demand instruction belongs to the entry demand instruction corresponding to the third-party voice skill.

Step 213, control the third-party voice skill to respond to the current demand instruction.

In this embodiment, the implementation of the steps 210 to 212 are similar to that of the steps 101 to 103 in the embodiment shown in FIG. 3 of the present application, and details are not described herein again.

Embodiment 3

Figure 10:
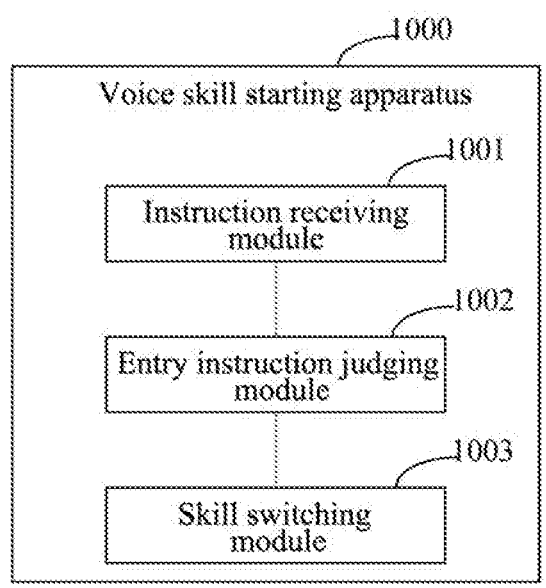
FIG. 10 is a schematic structural diagram of a voice skill starting apparatus according to a third embodiment of the present application.

FIG. 10 is a schematic structural diagram of a voice skill starting apparatus provided according to a third embodiment of the present application. As shown in FIG. 10, the voice skill starting apparatus provided in this embodiment is located in an electronic device including at least one third-party voice skill and a built-in voice skill, and the electronic device is currently in the built-in voice skill. The voice skill starting apparatus 1000 includes: an instruction receiving module 1001, an entry instruction judging module 1002 and a skill switching module 1003.

The instruction receiving module 1001 is configured to receive a current demand instruction of a user. The entry instruction judging module 1002 is configured to judge whether the current demand instruction belongs to an entry demand instruction corresponding to the third-party voice skill according to a mapping relationship in response to the current demand instruction, where the mapping relationship is a pre-established mapping relationship between the third-party voice skill and the entry demand instruction, the mapping relationship is determined according to skill-associated characteristic data of a first historical demand instruction under each third-party voice skill, and the first historical demand instruction is located in the built-in voice skill. The skill switching module 1003 is configured to switch the built-in voice skill to the third-party voice skill if it is determined that the current demand instruction belongs to the entry demand instruction corresponding to the third-party voice skill.

The voice skill starting apparatus provided in this embodiment can execute the technical solution of the method embodiment shown in FIG. 3, and the implementation principles and technical effects thereof are similar to the method embodiment shown in FIG. 3, which are not repeated here.

Embodiment 4

Figure 11:
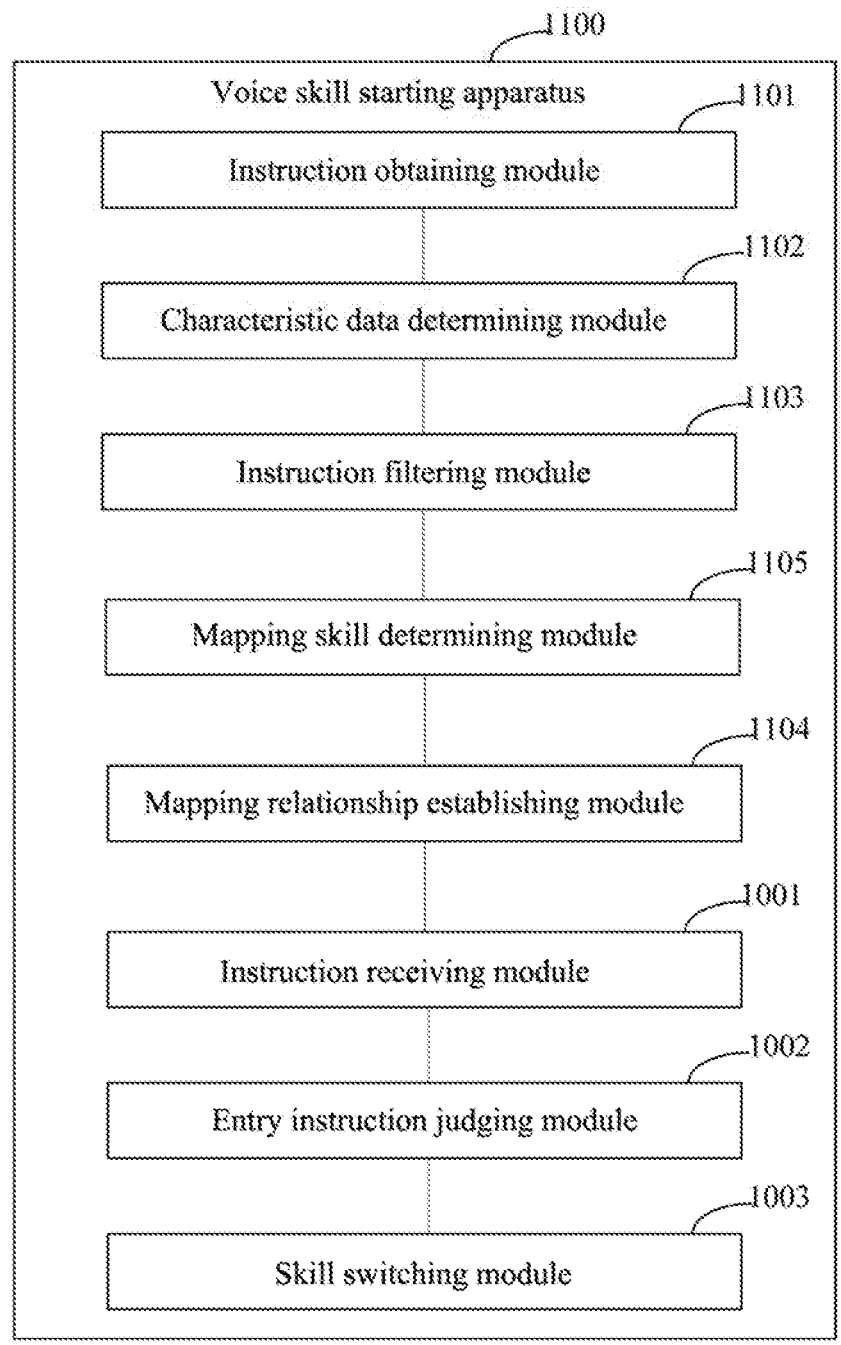
FIG. 11 is a schematic structural diagram of a voice skill starting apparatus according to a fourth embodiment of the present application.

FIG. 11 is a schematic structural diagram of a voice skill starting apparatus provided according to a fourth embodiment of the present application. As shown in FIG. 11, the voice skill starting apparatus provided in this embodiment is based on the voice skill starting apparatus provided in Embodiment 3 of the present application, the voice skill starting apparatus 1100 further includes: an instruction obtaining module 1101, a characteristic data determining module 1102, an instruction filtering module 1103, a mapping relationship establishing module 1104 and a mapping skill determining module 1105.

Further, the instruction obtaining module 1101 is configured to obtain the first historical demand instruction in the built-in voice skill. The characteristic data determining module 1102 is configured to determine the skill-associated characteristic data of the first historical demand instruction under each third-party voice skill. The instruction filtering module 1103 is configured to obtain the entry demand instruction corresponding to each third-party voice skill by filtering the first historical demand instruction according to the skill-associated characteristic data. The 1104 mapping relationship establishing module is configured to establish the mapping relationship between each third-party voice skill and the corresponding entry demand instruction.

Further, the voice skill starting apparatus in this embodiment further includes the mapping skill determining module 1105.

The mapping skill determining module 1105 is configured to judge whether there is one third-party voice skill corresponding to each entry demand instruction; if there are multiple third-party voice skills corresponding to an entry demand instruction, determine an occurrence frequency of that entry demand instruction in each corresponding third-party voice skill; and determine a third-party voice skill with the highest occurrence frequency as the third-party voice skill that has the mapping relationship with that entry demand instruction.

Further, the characteristic data determining module 1102 is configured to: determine skill-associated entry characteristic data of the first historical demand instruction under each third-party voice skill; and determine skill satisfaction data of a second historical demand instruction in the first historical demand instruction under each third-party voice skill.

Further, the instruction filtering module 1103 is configured to: obtain the second historical demand instruction corresponding to each third-party voice skill by filtering the first historical demand instruction according to the skill-associated entry characteristic data; and obtain the entry demand instruction corresponding to each third-party voice skill by filtering the second historical demand instruction according to the skill satisfaction data.

Further, the instruction filtering module 1103, when obtaining the second historical demand instruction corresponding to each third-party voice skill by filtering the first historical demand instruction according to the skill-associated entry characteristic data, is configured to: input the skill-associated entry characteristic data of the first historical demand instruction into a trained-to-converged classification model corresponding to each third-party voice skill for classifying the first historical demand instruction by the classification model to obtain the second historical demand instruction corresponding to each third-party voice skill.

Further, the instruction filtering module 1103, before inputting the skill-associated entry characteristic data of the first historical demand instruction into the trained-to-converged classification model corresponding to each third-party voice skill, is further configured to: obtain a training sample of each classification model, where the training sample is a demand instruction sample, and the demand instruction sample has an identifier for identifying whether a demand instruction is capable of being used as the entry demand instruction corresponding to the third-party voice skill; and train the corresponding classification model by using skill-associated entry characteristic data of the training sample until convergence, to obtain each trained-to-converged classification model.

The skill-associated entry characteristic data includes: entry behavior characteristic data, skill correlation characteristic data, and entry grammar characteristic data.

Further, the skill satisfaction data includes content satisfaction or interaction satisfaction, and the characteristic data determining module 1102, when determining the skill satisfaction data of the second historical demand instruction in the first historical demand instruction under each third-party voice skill, is configured to: judge whether each third-party voice skill is a resource skill; if a third-party voice skill is the resource skill, determine a content satisfaction of the second historical demand instruction under that third-party voice skill; and if a third-party voice skill is a non-resource skill, determine an interaction satisfaction of the second historical demand instruction under that third-party voice skill.

Further, the characteristic data determining module 1102, when determining the content satisfaction of the second historical demand instruction under that third-party voice skill, is configured to: obtain a first playback resource duration of the second historical demand instruction under that third-party voice skill and a second playback resource duration of the second historical demand instruction under the built-in voice skill; and determine the content satisfaction according to the first playback resource duration and the second playback resource duration.

Further, the characteristic data determining module 1102, when determining the interaction satisfaction of the second historical demand instruction under that third-party voice skill, is configured to: obtain text of a multi-round conversation corresponding to the second historical demand instruction under that third-party voice skill; determine a skill response satisfaction and a skill response repetition rate of the second historical demand instruction under that third-party voice skill according to the text of the multi-round conversation; and determine the interaction satisfaction according to the skill response satisfaction and the skill response repetition rate.

Further, the instruction filtering module 1103, when obtaining the entry demand instruction by filtering the second historical demand instruction according to the skill satisfaction data, is configured to: if a third-party voice skill is the resource skill, obtain the entry demand instruction by filtering the second historical demand instruction according to a content satisfaction of the second historical demand instruction under that third-party voice skill; and if a third-party voice skill is a non-resource skill, obtain the entry demand instruction by filtering the second historical demand instruction according to an interaction satisfaction of the second historical demand instruction under that third-party voice skill after it is determined that there is no playback resource record corresponding to the second historical demand instruction in the built-in voice skill.

The voice skill starting apparatus provided in this embodiment can execute the technical solution of the method embodiment shown in FIG. 4 to FIG. 9, and the implementation principles and technical effects thereof are similar to the method embodiment shown in FIG. 4 to FIG. 9, which are not repeated here.

According to an embodiment of the present application, the present application further provides an electronic device and a readable storage medium.

Figure 12:
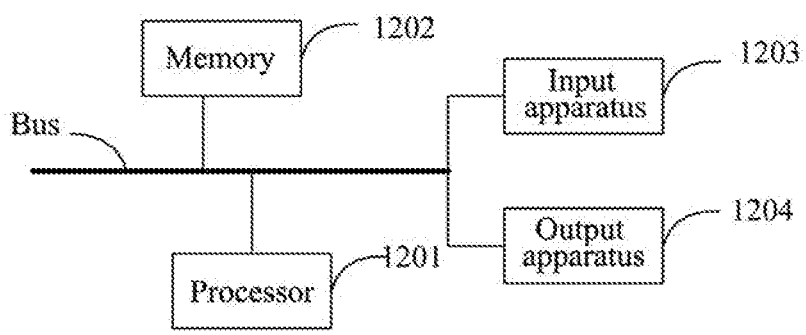
FIG. 12 is a block diagram of an electronic device for implementing a voice skill starting method according to an embodiment of the present application.

As shown in FIG. 12, it is a block diagram of an electronic device according to a voice skill starting method according to an embodiment of the present application. The electronic device is intended for various forms of digital computers with a voice interaction function, such as laptop computers, desktop computers, workbenches, personal digital assistants, servers, blade servers, mainframe computers, and other suitable computers. The electronic device may also represent various forms of mobile devices with a voice interaction function, such as personal digital assistants, cellular phones, smart phones, wearable devices, and other similar computing devices. The electronic device may also represent various forms of home appliances with a voice interaction function, such as smart speakers, smart televisions, and smart refrigerators. The components, connections and relationships thereof, and functions thereof shown herein are merely examples, and are not intended to limit the implementation of the present application described and/or required herein.

As shown in FIG. 12, the electronic device includes: one or more processors 1201, a memory 1202, and an interface for connecting components, including a high-speed interface and a low-speed interface. The components are interconnected using different buses and can be mounted on a common motherboard or mounted in other ways as required. The processor may process instructions executed within the electronic device, including instructions stored in or on the memory to display graphical information of a GUI on an external input/output apparatus such as a display device coupled to the interface. In other implementations, multiple processors and or multiple buses can be used with multiple memories and multiple memories, if required. Similarly, multiple electronic devices can be connected, each of which provides some necessary operations (for example, as a server array, a group of blade servers, or a multiprocessor system). In FIG. 12, one processor 1201 is taken as an example.

The memory 1202 is a non-transitory computer-readable storage medium provided by the present application. The memory stores instructions executable by at least one processor, so that the at least one processor executes the voice skill starting method provided in the present application. The non-transitory computer-readable storage medium of the present application stores computer instructions, which are used to cause a computer to execute the voice skill starting method provided by the present application.

The memory 1202 is a non-transitory computer-readable storage medium, and can be used to store non-transitory software programs, non-transitory computer executable programs and modules, such as program instructions/modules corresponding to the voice skill starting method in the embodiments of the present application (for example, the instruction receiving module 1001, the entry instruction judging module 1002, and the skill switching module 1003 shown in FIG. 10). The processor 1201 executes various functional applications and data processing of the server by running the non-transitory software programs, instructions and modules stored in the memory 1202, and thus the voice skill starting method in the above mentioned method embodiment is implemented.

The memory 1202 may include a storage program area and a storage data area, where the storage program area may store an operating system and an application required for at least one function; the storage data area may store data created and the like according to the use of the electronic device of FIG. 12. In addition, the memory 1202 may include a high-speed random access memory, and may also include a non-transitory memory, such as at least one magnetic disk storage device, a flash memory device, or other non-transitory solid-state storage devices. In some embodiments, the memory 1202 may include a memory remotely disposed with respect to the processor 1201, and these remote memories may be connected to the electronic device of FIG. 12 through a network. Examples of the above network include, but are not limited to, an Internet, an intranet, a local area network, a mobile communication network, and combinations thereof.

The electronic device in FIG. 12 may further include an input apparatus 1203 and an output apparatus 1204. The processor 1201, the memory 1202, the input apparatus 1203, and the output apparatus 1204 may be connected through a bus or in other ways. In FIG. 12, a connection through a bus is taken as an example.

The input apparatus 1203 can receive input voice, number, or character information, and generate a key signal input related to user setting and function control of the electronic device of FIG. 12, for example input apparatus such as a touch screen, a keypad, a mouse, a track pad, a touchpad, and a pointing stick, one or more mouse buttons, trackballs, joysticks. The output apparatus 1204 may include a voice playback device, a display device, an auxiliary lighting device (for example, an LED), a haptic feedback apparatus (for example, a vibration motor), and the like. The display device may include, but is not limited to, a liquid crystal display (LCD), a light emitting diode (LED) display, and a plasma display. In some embodiments, the display device may be a touch screen.

Various implementations of the systems and technologies described herein may be implemented in a digital electronic circuit system, an integrated circuit system, an ASIC (application-specific integrated circuit), a computer hardware, firmware, software, and/or combinations thereof. These implementations may include: implemented in one or more computer programs, which may be executed and/or interpreted on a programmable system including at least one programmable processor, the programmable processor may be a dedicated or general-purpose programmable processor, which may receive data and instructions from a storage system, at least one input apparatus, and at least one output apparatus, and transmit the data and instructions to the storage system, the at least one input apparatus, and the at least one output apparatus.

These computing programs (also known as programs, software, software applications, or codes) include machine instructions of a programmable processor and can be implemented using high-level procedures and/or object-oriented programming languages, and/or assembly/machine languages. As used herein, the terms "machine-readable medium" and "computer-readable medium" refer to any computer program product, device, and/or apparatus used to provide machine instructions and/or data to the programmable processor (for example, a magnetic disk, an optical disk, a memory, a programmable logic device (PLD), including machine-readable medium that receives machine instructions acting as machine-readable signals. The term "machine-readable signal" refers to any signal used to provide the machine instructions and/or data to the programmable processor.

To provide interaction with the user, the systems and technologies described herein can be implemented on a computer that has a display device (e.g. a CRT (cathode ray tube) or LCD (liquid crystal display) monitor) for displaying information to the user); and a keyboard and pointing apparatus (such as a mouse or trackball) through which the user can provide input to the computer. Other kinds of apparatuses may also be used to provide interaction with the user; for example, a feedback provided to the user may be any form of sensory feedback (for example, visual feedback, auditory feedback, or haptic feedback); and may receive input from the user in any form (including acoustic input, voice input, or tactile input).

The systems and technologies described herein may be implemented in a computing system including back-end components (e.g. as a data server), or a computing system including middleware components (e.g. an application server), or a computing system including front-end components (for example, a user computer with a graphical user interface or web browser through which the user can interact with the implementation of the systems and technologies described herein), or a computing system including any combination of such back-end components, middleware components, or any combination of front-end components. The components of the system may be interconnected by digital data communication (e.g. a communication network) in any form or medium. Examples of the communication network include: a local area network (LAN), a wide area network (WAN), and an Internet.

The computer system may include a client and a server. The client and server are generally remote from each other and typically interact through a communication network. A relationship between the client and the server is generated by computer programs running on a corresponding computer and having a client-server relationship with each other.

According to the technical solution in the embodiment of the present application, when the electronic device is currently in the built-in voice skill, it is judged whether the current demand instruction belongs to the entry demand instruction of the third-party voice skill, which can enable the third-party voice skill to compete fairly with the current built-in voice skill. And since the entry demand instruction having the mapping relationship with the third-party voice skill is obtained by filtering the first historical demand instruction according to the skill-associated characteristic data of the first historical demand instruction under each third-party voice skill, and a correlation between the entry demand instruction and the third-party voice skill is stronger than a correlation between the entry demand instruction and the built-in voice skill, hence when it is determined that the current demand instruction is an entry demand instruction of a third-party voice skill, and user's requirements are better satisfied by a response of the third-party voice skill than a response of the current built-in voice skill.

It should be understood that the various forms of processes shown above can be used to reorder, add, or delete steps. For example, the steps described in the present application can be executed in parallel, sequentially, or in different orders, as long as the desired results of the technical solutions disclosed in the present application can be achieved, which is no limited herein.

The above mentioned implementation does not constitute a limitation on the protection scope of the present application. It should be understood by those skilled in the art that various modifications, combinations, sub-combinations, and substitutions may be made according to design requirements and other factors. Any modification, equivalent substitution and improvement made within the spirit and principle of the present application shall be included in the protection scope of the present application.

What is claimed is:

1. A voice skill starting method, wherein the method is applied to an electronic device comprising at least one third-party voice skill and a built-in voice skill, and the electronic device is currently in the built-in voice skill, and the method comprises:

receiving a current demand instruction of a user;

judging whether the current demand instruction belongs to an entry demand instruction corresponding to the third-party voice skill according to a mapping relationship in response to the current demand instruction, wherein the mapping relationship is a pre-established mapping relationship between the third-party voice skill and the entry demand instruction, the mapping relationship is determined according to skill-associated characteristic data of a first historical demand instruction under each third-party voice skill, and the first historical demand instruction is located in the built-in voice skill, the skill-associated characteristic data includes skill-associated entry characteristic data and skill satisfaction data, the skill-associated entry characteristic data is data associated with the third-party voice skill and representing a characteristic of the entry demand instruction, the skill satisfaction data indicates characteristic data of whether the third-party voice skill satisfies a second historical demand instruction, and the second historical demand instruction is a historical demand instruction filtered from the first historical demand instruction according to the skill-associated entry characteristic data; and switching from the built-in voice skill to the third-party voice skill if it is determined that the current demand instruction belongs to the entry demand instruction corresponding to the third-party voice skill;

before the receiving a current demand instruction of a user, further comprising:

obtaining the first historical demand instruction in the built-in voice skill;

determining the skill-associated characteristic data of the first historical demand instruction under each third-party voice skill;

obtaining the entry demand instruction corresponding to each third-party voice skill by filtering the first historical demand instruction according to the skill-associated characteristic data; and establishing the mapping relationship between each third-party voice skill and the corresponding entry demand instruction;

wherein the determining the skill-associated characteristic data of the first historical demand instruction under each third-party voice skill, comprises:

determining skill-associated entry characteristic data of the first historical demand instruction under each third-party voice skill; and determining skill satisfaction data of the second historical demand instruction in the first historical demand instruction under each third-party voice skill;

wherein the skill satisfaction data comprises content satisfaction or interaction satisfaction, and the determining skill satisfaction data of the second historical demand instruction in the first historical demand instruction under each third-party voice skill, comprises:

judging whether each third-party voice skill is a resource skill;

if a third-party voice skill is the resource skill, determining a content satisfaction of the second historical demand instruction under that third-party voice skill; and if a third-party voice skill is a non-resource skill, determining an interaction satisfaction of the second historical demand instruction under that third-party voice skill;

wherein the determining the content satisfaction of the second historical demand instruction under that third-party voice skill, comprises:

obtaining a first playback resource duration of the second historical demand instruction under that third-party voice skill and a second playback resource duration of the second historical demand instruction under the built-in voice skill; and determining the content satisfaction according to the first playback resource duration and the second playback resource duration.

2. The method according to claim 1, after the obtaining the entry demand instruction corresponding to each third-party voice skill by filtering the first historical demand instruction according to the skill-associated characteristic data, further comprising:

judging whether there is one third-party voice skill corresponding to each entry demand instruction;

if there are multiple third-party voice skills corresponding to an entry demand instruction, determining an occurrence frequency of that entry demand instruction in each corresponding third-party voice skill; and determining a third-party voice skill with the highest occurrence frequency as the third-party voice skill that has the mapping relationship with that entry demand instruction.

3. The method according to claim 1, wherein the obtaining the entry demand instruction corresponding to each third-party voice skill by filtering the first historical demand instruction according to the skill-associated characteristic data, comprises:

obtaining the second historical demand instruction corresponding to each third-party voice skill by filtering the first historical demand instruction according to the skill-associated entry characteristic data; and obtaining the entry demand instruction corresponding to each third-party voice skill by filtering the second historical demand instruction according to the skill satisfaction data.

4. A voice skill starting apparatus, wherein the apparatus is located in an electronic device comprising at least one third-party voice skill and a built-in voice skill, and the electronic device is currently in the built-in voice skill, and the apparatus comprises:

at least one processor; and a memory, communicatively connected with the at least one processor; wherein the memory stores instructions executable by the at least one processor, and the instruction is executed by the at least one processor to enable the at least one processor to:

receive a current demand instruction of a user;

judge whether the current demand instruction belongs to an entry demand instruction corresponding to the third-party voice skill according to a mapping relationship in response to the current demand instruction, wherein the mapping relationship is a pre-established mapping relationship between the third-party voice skill and the entry demand instruction, the mapping relationship is determined according to skill-associated characteristic data of a first historical demand instruction under each third-party voice skill, and the first historical demand instruction is located in the built-in voice skill, the skill-associated characteristic data includes skill-associated entry characteristic data and skill satisfaction data, the skill-associated entry characteristic data is data associated with the third-party voice skill and representing a characteristic of the entry demand instruction, the skill satisfaction data indicates characteristic data of whether the third-party voice skill satisfies a second historical demand instruction, and the second historical demand instruction is a historical demand instruction filtered from the first historical demand instruction according to the skill-associated entry characteristic data; and switch from the built-in voice skill to the third-party voice skill if it is determined that the current demand instruction belongs to the entry demand instruction corresponding to the third-party voice skill;

wherein the instruction is executed by the at least one processor to enable the at least one processor, before the receiving a current demand instruction of a user, to:

obtain the first historical demand instruction in the built-in voice skill;

determine the skill-associated characteristic data of the first historical demand instruction under each third-party voice skill;

obtain the entry demand instruction corresponding to each third-party voice skill by filtering the first historical demand instruction according to the skill-associated characteristic data; and establish the mapping relationship between each third-party voice skill and the corresponding entry demand instruction;

wherein the instruction is executed by the at least one processor to enable the at least one processor, when determining the skill-associated characteristic data of the first historical demand instruction under each third-party voice skill, to:

determine skill-associated entry characteristic data of the first historical demand instruction under each third-party voice skill; and determine skill satisfaction data of the second historical demand instruction in the first historical demand instruction under each third-party voice skill;

wherein the skill satisfaction data comprises content satisfaction or interaction satisfaction, and the instruction is executed by the at least one processor to enable the at least one processor, when determining skill satisfaction data of the second historical demand instruction in the first historical demand instruction under each third-party voice skill, to:

judge whether each third-party voice skill is a resource skill;

if a third-party voice skill is the resource skill, determine a content satisfaction of the second historical demand instruction under that third-party voice skill; and if a third-party voice skill is a non-resource skill, determine an interaction satisfaction of the second historical demand instruction under that third-party voice skill;

wherein the instruction is executed by the at least one processor to enable the at least one processor, when determining the content satisfaction of the second historical demand instruction under that third-party voice skill, to:

obtain a first playback resource duration of the second historical demand instruction under that third-party voice skill and a second playback resource duration of the second historical demand instruction under the built-in voice skill; and determine the content satisfaction according to the first playback resource duration and the second playback resource duration.

5. The voice skill starting apparatus according to claim 4, wherein the instruction is executed by the at least one processor to enable the at least one processor to:

judge whether there is one third-party voice skill corresponding to each entry demand instruction;

if there are multiple third-party voice skills corresponding to an entry demand instruction, determine an occurrence frequency of that entry demand instruction in each corresponding third-party voice skill; and determine a third-party voice skill with the highest occurrence frequency as the third-party voice skill that has the mapping relationship with that entry demand instruction.

6. The voice skill starting apparatus according to claim 4, wherein the instruction is executed by the at least one processor to enable the at least one processor to:

obtain the second historical demand instruction corresponding to each third-party voice skill by filtering the first historical demand instruction according to the skill-associated entry characteristic data; and obtain the entry demand instruction corresponding to each third-party voice skill by filtering the second historical demand instruction according to the skill satisfaction data.

7. The voice skill starting apparatus according to claim 6, wherein the instruction is executed by the at least one processor to enable the at least one processor, when obtaining the second historical demand instruction corresponding to each third-party voice skill by filtering the first historical demand instruction according to the skill-associated entry characteristic data, to:

input the skill-associated entry characteristic data of the first historical demand instruction into a trained-to-converged classification model corresponding to each third-party voice skill for classifying the first historical demand instruction by the classification model to obtain the second historical demand instruction corresponding to each third-party voice skill.

8. The voice skill starting apparatus according to claim 7, wherein the instruction is executed by the at least one processor to enable the at least one processor, before inputting the skill-associated entry characteristic data of the first historical demand instruction into the trained-to-converged classification model corresponding to each third-party voice skill, to:

obtain a training sample of each classification model, wherein the training sample is a demand instruction sample, and the demand instruction sample has an identifier for identifying whether a demand instruction is capable of being used as the entry demand instruction corresponding to the third-party voice skill; and train the corresponding classification model by using skill-associated entry characteristic data of the training sample until convergence, to obtain each trained-to-converged classification model.

9. The voice skill starting apparatus according to claim 4, wherein the skill-associated entry characteristic data comprises: entry behavior characteristic data, skill correlation characteristic data, and entry grammar characteristic data.

10. The voice skill starting apparatus according to claim 4, wherein the instruction is executed by the at least one processor to enable the at least one processor, when determining the interaction satisfaction of the second historical demand instruction under that third-party voice skill, to:

obtain text of a multi-round conversation corresponding to the second historical demand instruction under that third-party voice skill;

determine a skill response satisfaction and a skill response repetition rate of the second historical demand instruction under that third-party voice skill according to the text of the multi-round conversation; and determine the interaction satisfaction according to the skill response satisfaction and the skill response repetition rate.

11. The voice skill starting apparatus according to claim 10, wherein the instruction is executed by the at least one processor to enable the at least one processor, when obtaining the entry demand instruction by filtering the second historical demand instruction according to the skill satisfaction data, to:

if a third-party voice skill is the resource skill, obtain the entry demand instruction by filtering the second historical demand instruction according to a content satisfaction of the second historical demand instruction under that third-party voice skill; and if a third-party voice skill is a non-resource skill, obtain the entry demand instruction by filtering the second historical demand instruction according to an interaction satisfaction of the second historical demand instruction under that third-party voice skill after it is determined that there is no playback resource record corresponding to the second historical demand instruction in the built-in voice skill.

12. A non-transitory computer-readable storage medium storing computer instructions, wherein the computer instructions are used to cause a computer to perform the method according to claim 1.

13. A voice skill starting method, wherein the method is applied to an electronic device comprising at least one third-party voice skill and a built-in voice skill, and the method comprises:

obtaining a current demand instruction of a user;

judging whether the current demand instruction belongs to an entry demand instruction corresponding to the third-party voice skill according to a mapping relationship, wherein the mapping relationship is a pre-established mapping relationship between the third-party voice skill and the entry demand instruction, and the mapping relationship is determined according to skill-associated characteristic data of a first historical demand instruction under each third-party voice skill, the skill-associated characteristic data includes skill-associated entry characteristic data and skill satisfaction data, the skill-associated entry characteristic data is data associated with the third-party voice skill and representing a characteristic of the entry demand instruction, the skill satisfaction data indicates characteristic data of whether the third-party voice skill satisfies a second historical demand instruction, and the second historical demand instruction is a historical demand instruction filtered from the first historical demand instruction according to the skill-associated entry characteristic data; and starting the third-party voice skill if it is determined that the current demand instruction belongs to the entry demand instruction corresponding to the third-party voice skill;

before the obtaining a current demand instruction of a user, further comprising:

obtaining the first historical demand instruction in the built-in voice skill;

determining the skill-associated characteristic data of the first historical demand instruction under each third-party voice skill;

obtaining the entry demand instruction corresponding to each third-party voice skill by filtering the first historical demand instruction according to the skill-associated characteristic data; and establishing the mapping relationship between each third-party voice skill and the corresponding entry demand instruction;

wherein the determining the skill-associated characteristic data of the first historical demand instruction under each third-party voice skill, comprises:

determining skill-associated entry characteristic data of the first historical demand instruction under each third-party voice skill; and determining skill satisfaction data of the second historical demand instruction in the first historical demand instruction under each third-party voice skill;

wherein the skill satisfaction data comprises content satisfaction or interaction satisfaction, and the determining skill satisfaction data of the second historical demand instruction in the first historical demand instruction under each third-party voice skill, comprises:

judging whether each third-party voice skill is a resource skill;

if a third-party voice skill is the resource skill, determining a content satisfaction of the second historical demand instruction under that third-party voice skill; and if a third-party voice skill is a non-resource skill, determining an interaction satisfaction of the second historical demand instruction under that third-party voice skill;

wherein the determining the content satisfaction of the second historical demand instruction under that third-party voice skill, comprises:

obtaining a first playback resource duration of the second historical demand instruction under that third-party voice skill and a second playback resource duration of the second historical demand instruction under the built-in voice skill; and determining the content satisfaction according to the first playback resource duration and the second playback resource duration.

* * * * *